(12) United States Patent
Ozawa et al.

(10) Patent No.: US 8,875,044 B2
(45) Date of Patent: Oct. 28, 2014

(54) IMAGE PROCESSING APPARATUS, IMAGE DISPLAY METHOD, AND IMAGE DISPLAY PROGRAM

(75) Inventors: Hiroyuki Ozawa, Tokyo (JP); Nobuki Furue, Tokyo (JP); Satoshi Akagawa, Tokyo (JP); Ayako Iwase, Kanagawa (JP)

(73) Assignee: Sony Corporation, Tokyo (JP)

( * ) Notice: Subject to any disclaimer, the term of this patent is extended or adjusted under 35 U.S.C. 154(b) by 742 days.

(21) Appl. No.: 12/580,627

(22) Filed: Oct. 16, 2009

(65) Prior Publication Data

US 2010/0125786 A1 May 20, 2010

(30) Foreign Application Priority Data

Nov. 19, 2008 (JP) ................................ 2008-295303

(51) Int. Cl.
| | | |
|---|---|---|
| *G06F 3/048* | (2013.01) | |
| *G06F 3/00* | (2006.01) | |
| *G06F 3/041* | (2006.01) | |
| *G06F 3/0488* | (2013.01) | |
| *G06F 3/0485* | (2013.01) | |
| *G06F 3/0484* | (2013.01) | |

(52) U.S. Cl.
CPC .......... *G06F 3/04886* (2013.01); *G06F 3/0485* (2013.01); *G06F 3/04845* (2013.01)
USPC ............................ 715/786; 715/720; 345/173

(58) Field of Classification Search
USPC ......................................... 715/719–726, 786
See application file for complete search history.

(56) References Cited

U.S. PATENT DOCUMENTS

| 5,583,791 A | * | 12/1996 | Harigaya et al. | ............... 348/575 |
| 6,747,680 B1 | | 6/2004 | Igarashi et al. | |
| 7,430,363 B2 | * | 9/2008 | Kogusuri et al. | ............. 386/241 |
| 7,515,172 B2 | * | 4/2009 | Rui et al. | ................... 348/14.03 |

(Continued)

FOREIGN PATENT DOCUMENTS

| JP | 2004-213451 | 7/2004 |
| JP | 2006-211078 | 8/2006 |

(Continued)

OTHER PUBLICATIONS

U.S. Appl. No. 12/479,269, filed Jun. 5, 2009, Ozawa, et al.

(Continued)

*Primary Examiner* — Doon Chow
*Assistant Examiner* — Shourjo Dasgupta
(74) *Attorney, Agent, or Firm* — Oblon, Spivak, McClelland, Maier & Neustadt, L.L.P.

(57) ABSTRACT

An image processing apparatus includes an image display element, an instruction position detection unit for accepting an instruction operation from a user through an operation face provided to a display screen of the image display element and detecting and outputting an instruction position of the instruction operation with respect to the operation face, a storage unit for storing and holding image data of images, and a display control unit for performing a control for displaying an image in accordance with the stored and held image data on the image display element, in which when the user performs a continuous movement on the operation face, the display control unit performs a control for scrolling the display image while being reduced together with images before and after the display image in accordance with a direction of the operation determined on the basis of a detection output from the instruction position detection unit.

19 Claims, 13 Drawing Sheets

(56) References Cited

U.S. PATENT DOCUMENTS

| | | | |
|---|---|---|---|
| 7,710,393 B2* | 5/2010 | Tsuk et al. | 345/156 |
| 2002/0167540 A1* | 11/2002 | Dobbelaar | 345/716 |
| 2004/0160458 A1 | 8/2004 | Igarashi et al. | |
| 2006/0022955 A1* | 2/2006 | Kennedy | 345/173 |
| 2006/0078294 A1* | 4/2006 | Haruki | 386/68 |
| 2006/0120624 A1* | 6/2006 | Jojic et al. | 382/284 |
| 2006/0120692 A1* | 6/2006 | Fukuta | 386/95 |
| 2007/0226646 A1 | 9/2007 | Nagiyama et al. | |
| 2008/0018615 A1* | 1/2008 | Zadesky et al. | 345/173 |
| 2008/0024444 A1 | 1/2008 | Abe et al. | |
| 2008/0243375 A1* | 10/2008 | Han | 701/208 |
| 2008/0308732 A1* | 12/2008 | Warnke et al. | 250/330 |
| 2009/0046110 A1* | 2/2009 | Sadler et al. | 345/660 |
| 2009/0072543 A1* | 3/2009 | Yeh | 290/55 |
| 2009/0160793 A1* | 6/2009 | Rekimoto | 345/173 |

FOREIGN PATENT DOCUMENTS

| | | |
|---|---|---|
| JP | 2006-295236 | 10/2006 |
| JP | 2007-43247 | 2/2007 |
| JP | 2008-33695 | 2/2008 |
| JP | 2008-98811 | 4/2008 |
| WO | WO 2007/129247 A1 | 11/2007 |

OTHER PUBLICATIONS

U.S. Appl. No. 12/496,984, filed Jul. 2, 2009, Iwase, et al.
U.S. Appl. No. 12/499,349, filed Jul. 8, 2009, Ozawa, et al.
U.S. Appl. No. 12/508,909, filed Jul. 24, 2009, Ozawa, et al.
U.S. Appl. No. 12/509,045, filed Jul. 24, 2009, Iwase, et al.
U.S. Appl. No. 12/559,163, filed Sep. 14, 2009, Ozawa, et al.
U.S. Appl. No. 12/582,046, filed Oct. 20, 2009, Iwase, et al.
U.S. Appl. No. 12/604,795, filed Oct. 23, 2009, Iwase, et al.
U.S. Appl. No. 12/607,508, filed Oct. 28, 2009, Iwase, et al.
U.S. Appl. No. 12/607,475, filed Oct. 28, 2009, Ozawa, et al.
Office Action issued Sep. 16, 2010, in Japanese Patent Application No. 2008-295303.
U.S. Appl. No. 12/776,856, filed May 10, 2010, Iwase, et al.
European Search Report issued Jul. 11, 2011, in Patent Application No. 09176452.2.
Takeo Igarashi, et al., "Speed-dependent Automatic Zooming for Browsing Large Documents", Proceedings of the 2000 ACM SIGCPR Conference, XP 1171601, Nov. 5-8, 2000, pp. 139-148.

* cited by examiner

FIG. 2

| FOLDER NAME | CREATION DATE TIME | METADATA |
|---|---|---|
| IMAGE PICKUP DATE TIME | FILE NAME 1 | ADDRESS ON RECORDING MEDIUM |
| IMAGE PICKUP DATE TIME | FILE NAME 2 | ADDRESS ON RECORDING MEDIUM |
| IMAGE PICKUP DATE TIME | FILE NAME 3 | ADDRESS ON RECORDING MEDIUM |
| ⋮ | ⋮ | ⋮ |

FIG. 3

| FILE NAME | IMAGE PICKUP DATE TIME | METADATA |
|---|---|---|
| IMAGE DATA | | |

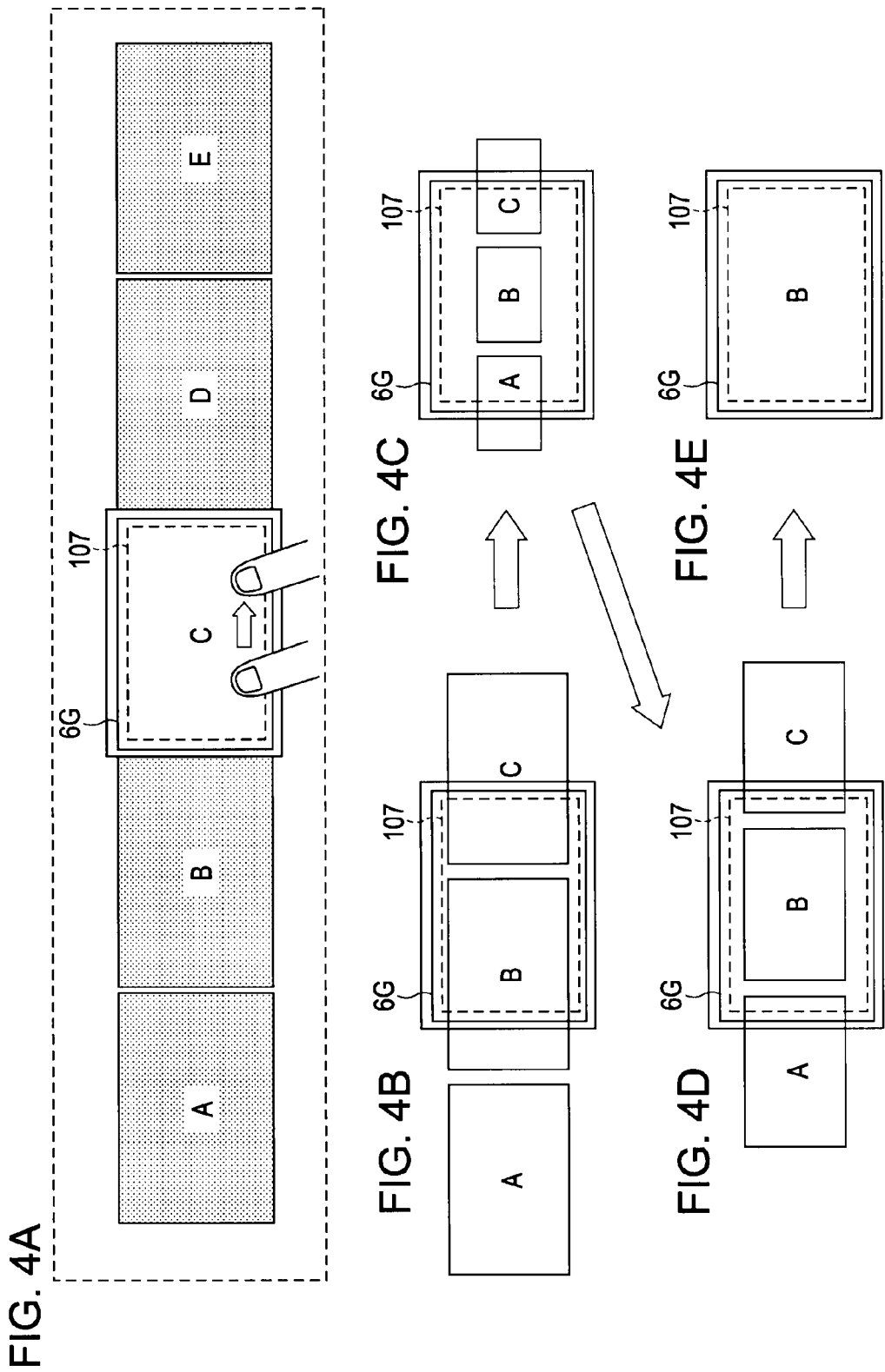

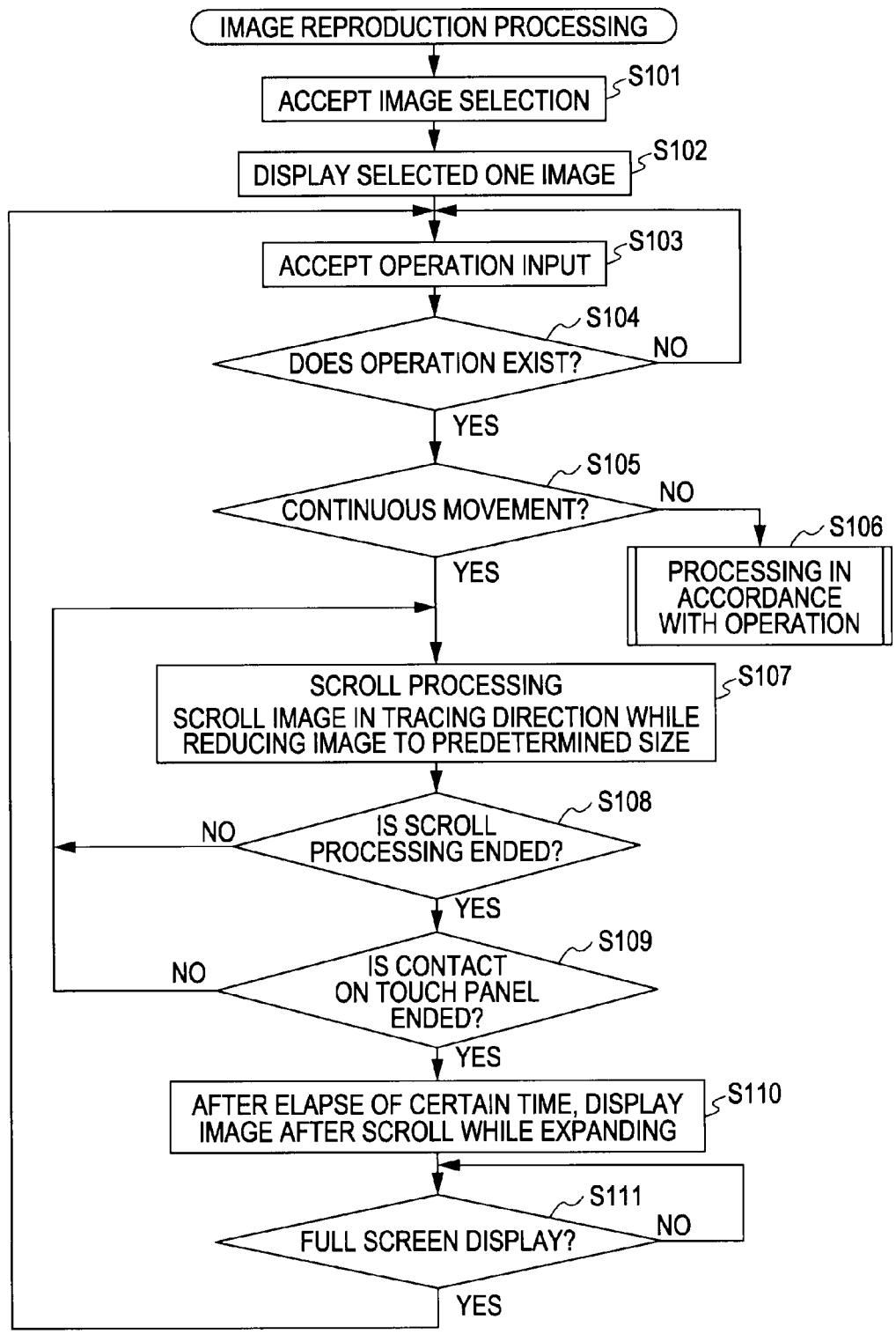

LENGTH OF CONTINUOUS MOVEMENT IS SHORT, SPEED IS SLOW

LENGTH OF CONTINUOUS MOVEMENT IS LONG, SPEED IS FAST

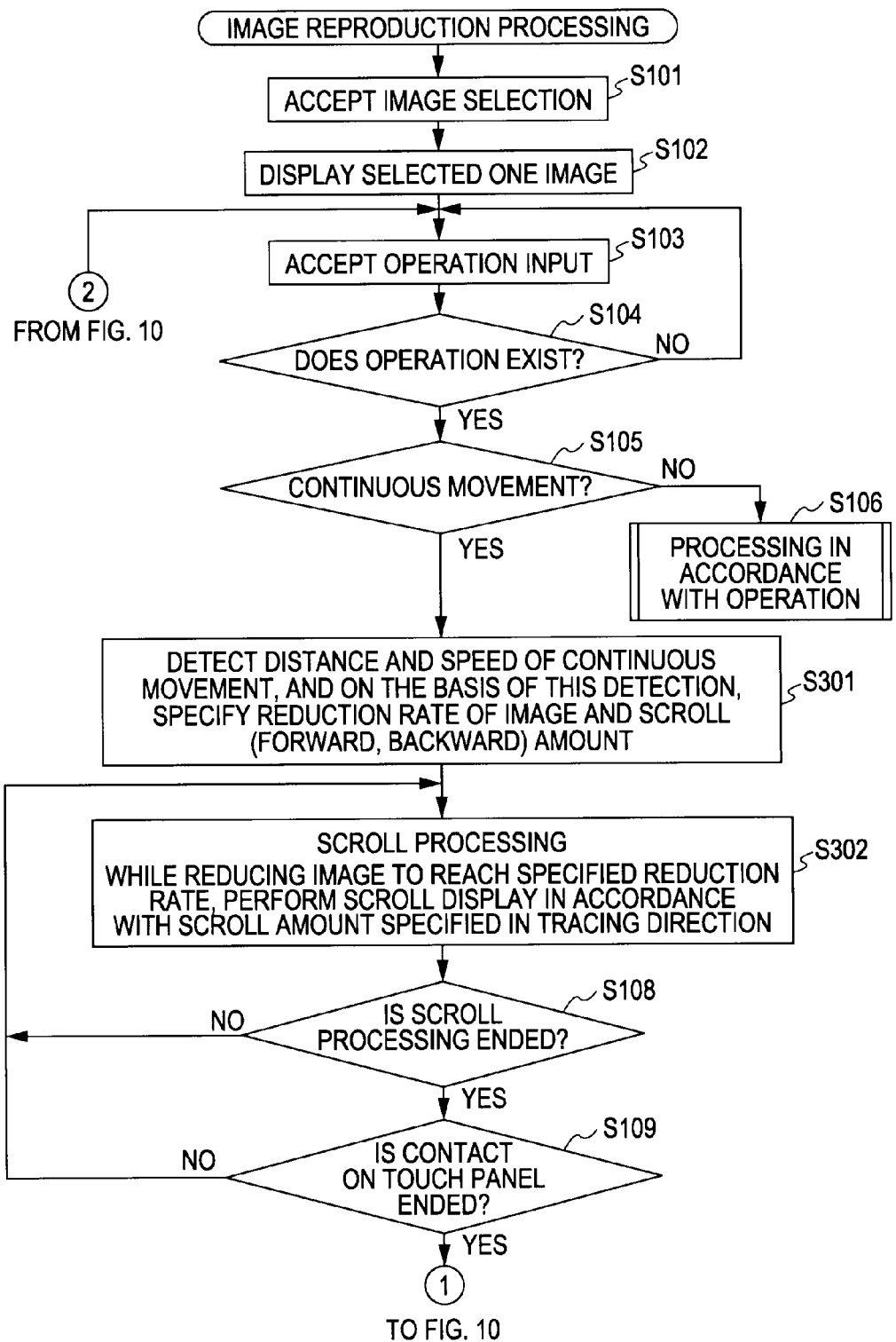

FIG. 10

FROM FIG. 9
①
↓
AFTER ELAPSE OF CERTAIN TIME, DISPLAY IMAGE AFTER SCROLL WHILE EXPANDING — S110
↓
S111 FULL SCREEN DISPLAY? — NO
↓ YES
②
TO FIG. 9

FIG. 11

| SPEED / DISTANCE | FAST | SLOW |
|---|---|---|
| SHORT | REDUCTION RATE LARGE / SCROLL AMOUNT LARGE | REDUCTION RATE SMALL / SCROLL AMOUNT SMALL |
| LONG | REDUCTION RATE LARGE / SCROLL AMOUNT LARGE | REDUCTION RATE SMALL / SCROLL AMOUNT SMALL |

CONTACT TIME SHORT    CONTACT TIME LONG
PRESSURE     LOW      PRESSURE     HIGH

IMAGE PROCESSING APPARATUS, IMAGE DISPLAY METHOD, AND IMAGE DISPLAY PROGRAM

BACKGROUND OF THE INVENTION

1. Field of the Invention

The present invention relates, for example, to an apparatus which is provided with a display element having a relatively large display screen and which is capable of displaying various images such as a digital still camera, a method used in the apparatus, and a program.

2. Description of the Related Art

A digital still camera for recording a picked up image as digital data in a recording medium is widely used. In recent years, a size of a built-in flash memory and a removable memory used in the digital still camera swiftly becomes smaller, and a capacity thereof is increased. Accordingly, a large amount of image data can be accumulated in these memories.

Then, in the digital still camera, the number of accumulated picked-up images is increased along the age of service, and there are a great number of cases where much image data is accumulated in the built-in flash memory and the removable memory at an unmanageable level with the brain of a user.

In the digital still camera, a large amount of image data obtained through the image pickup is managed in terms of a category (folder) by using predetermined information such as date and time as its base.

For example, like an assembly of image data picked up on Jan. 1, 2008, a large amount of image data picked up on the same image pickup date is managed in one folder or the like. Also, like "athletic festival", "birthday party", or the like, a folder with a name input by the user is formed, and the image data obtained through the image pickup is assembled in this folder.

In this way, it is possible for the user to collectively manage the image data obtained through the image pickup in a predetermined event in the folder specified by the date and time, the folder name input by the user, or the like. Also, normally, the image data obtained through the image pickup is stored in an order of the image pickup (time sequence order).

Then, among the image processing apparatuses such as the digital still camera, some apparatuses can perform a matrix display in which a plurality of images are displayed on one screen (list display) or a scroll display in which images to be displayed on the screen are sequentially changed (screen feed display).

By using these matrix display function and scroll display function, it is possible to find out a target image from the folder in which a large number of images are stored.

It should be noted that Japanese Unexamined Patent Application Publication No. 2006-295236 which will be described below discloses a technology for performing a matrix display with which it is possible to efficiently grasp the inside of a plurality of recorded contents. Also, Japanese Unexamined Patent Application Publication No. 2008-033695 which will be described below discloses a technology for performing a scroll display with which it is possible to perform the scroll display for the image at a scroll amount in accordance with an operation of the user.

SUMMARY OF THE INVENTION

Incidentally, in a case where image data of a target image is searched for from a folder storing image data of a plurality of images, by performing the matrix display or the scroll display as described above, it is possible to find the target image.

However, in the case of a portable image processing apparatus such as a digital still camera, a size of a display screen for a mounted display element such as an LCD (Liquid Crystal Display) is smaller as compared with a personal computer or the like.

For this reason, in the case of the matrix display or the scroll display in which a plurality of images are set as display targets on the one screen, the size of the image to be displayed inevitably becomes smaller, and it may be difficult to recognize a type of the image.

For this reason, in some cases, the images stored in the folder are sequentially displayed one by one on the display screen to be checked. In this case, a situation during the image pickup remains in a memory of the user if the folder contains recently picked-up images.

For this reason, when one image stored in the relevant folder is looked at, it is possible to understand what types of images exist before and after the one image. Thus, by performing feeding the display images forward and backward as the occasion demands, it is possible to find out the target image relatively quickly.

However, the number of folders storing the image data of many images is increased at an unmanageable level with the brain of the user along the age of service of the digital still camera. For this reason, in the case of the folder storing the image data of the images picked up a long time ago (for example, several years ago) or the like, even when one image stored in this folder is looked at, it is difficult to remember what types of images exist before and after the one image in many cases.

In such a case, the images of the image data stored in the folder are reproduced and displayed one by one, and by checking the images back and forth, an anteroposterior relation in a time sequence manner between the respective images is grasped.

Also, such an operation may be performed in some cases that the matrix display and the one-image display of the selected image from the matrix display are repeatedly performed, and also the scroll display and the one-image display of the selected image from the scroll display are repeatedly performed.

For this reason, in a case where the target image is to be found out from a folder storing the image data of many images, a bothersome operation should be performed, and a processing to find out the image takes time, which may cause stress.

In view of the above-mentioned circumstances, according to an embodiment of the present invention, it is desirable to display an image in accordance with image data recorded on a recording medium in an effective mode so as to clarify a relation between images before and after the relevant image and make it easier to find out a target image.

In order to solve the above-mentioned problem, according to an embodiment of the present invention, there is provided an image processing apparatus including:

an image display element;

instruction position detection means configured to accept an instruction operation from a user through an operation face provided to a display screen of the image display element and detect and output an instruction position of the instruction operation with respect to the operation face;

storage means configured to store and hold image data of a plurality of images; and display control means configured to perform a control for displaying an image in accordance with the image data stored and held by the storage means on the image display element, in which in a case where the user performs a continuous movement on the operation face, the display control means performs a control for scrolling the display image while being reduced together with images before and after the display image in accordance with a direction of the operation determined on the basis of a detection output from the instruction position detection means.

With the image processing apparatus according to the embodiment of the present invention, the display control means has the function of performing the control for displaying the image in accordance with the image data stored in the storage means on the display screen of the image display element. In a case where the continuous movement on the operation face of the instruction position detection means is performed, by the display control means, in accordance with the direction of the operation determined on the basis of the detection result from the instruction position detection means, it is possible to scroll the display image together with the images before and after the display image while being reduced.

With this configuration, it is possible to display the image in accordance with the image data recorded on the recording medium in the effective mode so as to clarify the relation between the images before and after the relevant image and make it easier to find out the target image.

Also, according to an embodiment of the present invention, there is provided an image processing apparatus including:

an image display element;

instruction position detection means configured to accept an instruction operation from a user through an operation face provided to a display screen of the image display element and detect and output an instruction position of the instruction operation with respect to the operation face;

storage means configured to store and hold image data of a plurality of images; and display control means configured to perform a control for displaying an image in accordance with the image data stored and held by the storage means on the image display element, in which in a case where the user performs an operation of keeping a contact position with respect to the operation face, the display control means performs a control for reducing a display image together with one or more images before and after the display image and displaying the images on a display screen of the image display element in accordance with an operation determined on the basis of a detection output from the instruction position detection means.

With the image processing apparatus according to the embodiment of the present invention, the display control means has the function of performing the control for displaying the image in accordance with the image data stored in the storage means on the display screen of the image display element. In a case where the operation of keeping the contact position with respect to the operation face of the instruction position detection means is performed, by the display control means, in accordance with the operation determined on the basis of the detection result from the instruction position detection means, it is possible to reduce the display image together with one or more images before and after the display image and display the images on the display screen of the image display element.

With this configuration, it is possible to display the image in accordance with the image data recorded on the recording medium in the effective mode so as to clarify the relation between the images before and after the relevant image and make it easier to find out the target image.

According to the embodiments of the present invention, it is possible to display the image in accordance with the image data recorded on the recording medium in the effective mode so as to clarify the relation between the images before and after the relevant image and make it easier to find out the target image.

BRIEF DESCRIPTION OF THE DRAWINGS

FIG. 2 is an explanatory diagram for explaining a layout example of an image folder formed on a recording medium of the image pickup apparatus;

FIG. 3 is an explanatory diagram for explaining a layout example of an image file recorded on the recording medium of the image pickup apparatus;

FIGS. 4A to 4E are explanatory diagrams for explaining an image display mode at the time of a display image scroll performed in the image pickup apparatus according to the first embodiment;

FIG. 5 is a flow chart for explaining a reproduction processing on picked-up images including the scroll processing performed in the image pickup apparatus according to the first embodiment;

FIG. 9 is a flow chart for explaining a reproduction processing on picked-up images including the scroll processing performed in the image pickup apparatus according to the third embodiment;

FIG. 10 is a flow chart continued from FIG. 9;

FIG. 11 is an explanatory diagram for explaining an example of a case in which a reduction rate of an image and a scroll amount are decided on the basis of a distance and a speed of a continuous movement;

DESCRIPTION OF THE PREFERRED EMBODIMENTS

Hereinafter, with reference to the drawings, an apparatus, a method, and a program according to embodiments of the present invention will be described.

First Embodiment

Configuration Example of an Image Pickup Apparatus

Figure 1:
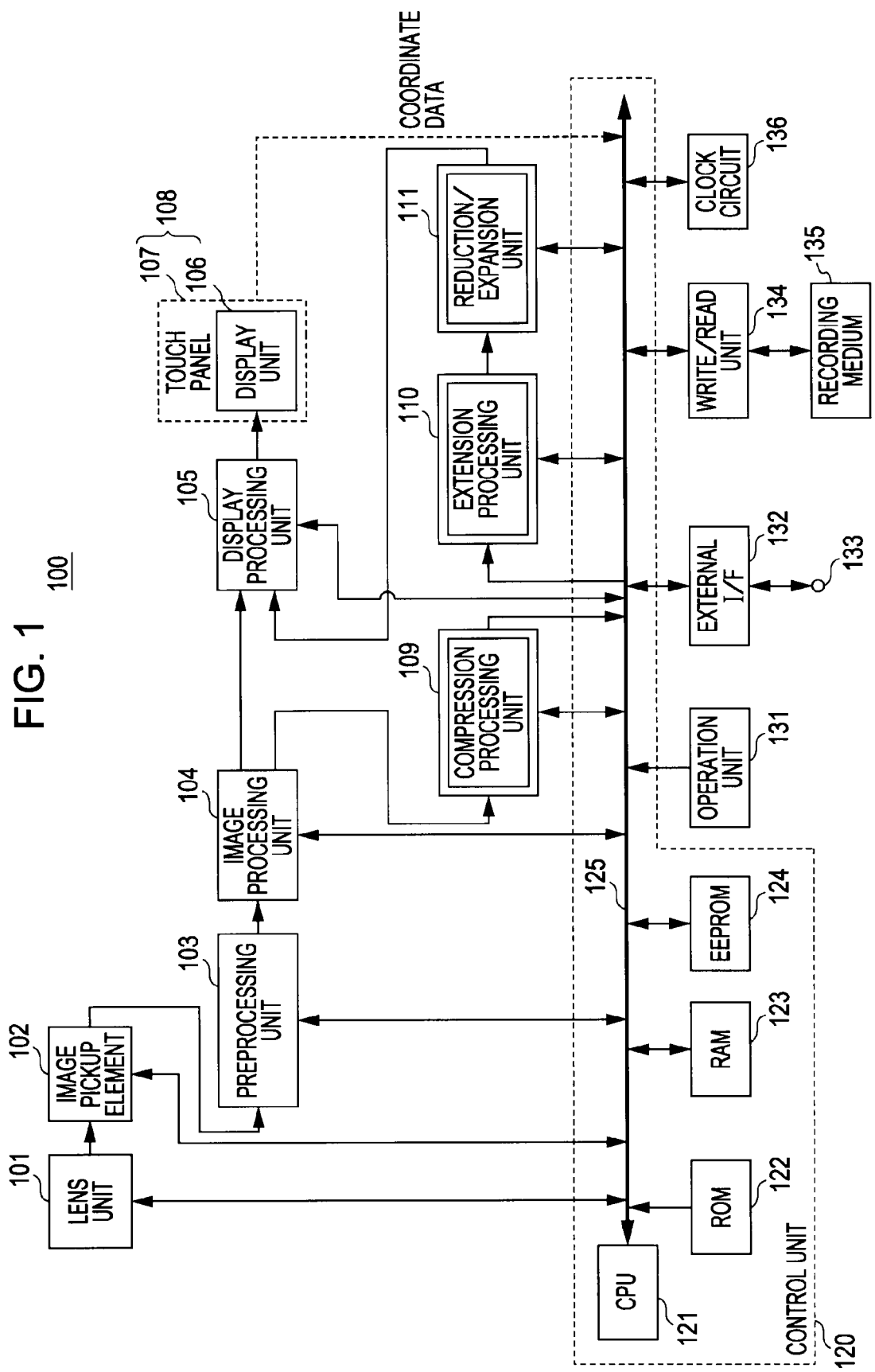
FIG. 1 is a block diagram for describing a configuration example of an image pickup apparatus according to a first embodiment of the present invention to which embodiments of an apparatus, a method, and a program according to an embodiment of the present invention are applied.

FIG. 1 is a block diagram for describing a configuration example of an image pickup apparatus 100 according to a first embodiment of the present invention to which embodiments of an apparatus, a method, and a program according to an embodiment of the present invention are applied. The image pickup apparatus 100 can pick up both still images and moving images record to be recorded on a recording medium by switching image pickup modes.

However, according to the first embodiment described below, for simplifying the description, the image pickup apparatus 100 uses a function as a digital still camera. By using as an example a case in which still images are mainly picked up and reproduced, a configuration and an operation of the image pickup apparatus 100 will be described.

As shown in FIG. 1, the image pickup apparatus 100 is provided with a lens unit 101, an image pickup element 102, a preprocessing unit 103, an image processing unit 104, a display processing unit 105, a display unit 106, a touch panel 107, a compression processing unit 109, an extension processing unit 110, and the reduction/expansion unit 111.

In addition, the image pickup apparatus 100 is provided with a control unit 120, an operation unit 131, an external interface (hereinafter, which will be abbreviated as external I/F) 132, an input and output terminal 133, a write/read unit 134, a recording medium 135, and a clock circuit 136.

The display unit 106 is composed, for example, of a so-called slim display element such as an LCD (Liquid Crystal Display) or an organic EL panel (Organic Electroluminescence Panel). Then, as will be described also below, the touch panel 107 is affixed on an entire surface of the display screen of the display unit 106 so as to form an operation face.

The touch panel 107 accepts an instruction operation (contact operation) with respect to the operation face from a user and detects an instruction position (contact position) on the operation face of the touch panel 107 to notify the control unit 120 of the coordinate data indicating the instruction position.

As will also be described below, the control unit 120 is configured to control the respective units of the image pickup apparatus 100 and also grasp what type of display is performed with respect to the display screen of the display unit 106. The control unit 120 can accept the instruction operation (input operation) from the user on the basis of the coordinate data indicating the instruction position on the operation face from the touch panel 107 and display information on the display screen of the display unit 106 corresponding to the instruction position.

For example, the user contacts a position on the operation face of on the touch panel 107 with a finger, a stylus, or the like. At this time, in a case where a number is displayed at a position on the display screen corresponding to (matched with) the contact position, the control unit 120 can determine that the user selects and input the number displayed thereon.

In this way, in the image pickup apparatus 100, the display unit 106 and the touch panel 107 form a touch screen 108 functioning as an input apparatus. It should be noted that the touch panel 107 is realized, for example, of a pressure-sensitive type or an electrostatic type.

Also, the touch panel 107 can detect the respective operations performed at the same time at a plurality of positions on the operation face and output coordinate data respectively indicating the contact positions. Also, the touch panel 107 can also detect the respective instruction operations repeatedly performed with respect to the operation face and output coordinate data respectively indicating the contact positions.

Furthermore, the touch panel 107 can also continuously detect contact positions for every predetermined timing while the filter or the stylus is in contact by the user and output coordinate data respectively indicating the contact positions.

With this configuration, the touch panel 107 can accept various instruction operations (operation inputs) from the user such as a so-called tap operation, a double tap operation, a drag operation, a flick operation, and a pinch operation and detect the instruction operations.

Herein, the tap operation is an action (operation) of indicating one predetermined point on the operation face once like "tap" by the finger of the user or the stylus. The double tap operation is an action of continuously indicating one predetermined point on the operation face two times like "tap, tap".

Also, the drag operation is an operation of shifting the finger of the user or the stylus while keeping in contact with the operation face. The flick operation is an operation of indicating one point on the operation face with the finger of the user or the stylus and quickly "flicking" in an arbitrary direction as it is.

The pinch operation is an operation of contacting two fingers of the user or the like on the operation face at the same time and opening or closing the two fingers or the like. In this case, in particular, the operation of opening the two contacted fingers or the like is referred to as pinch-out operation, and the operation of closing the two fingers or the like is referred to as pinch-in operation.

The drag operation and the flick operation are different in the operation speed, but in both the operations, after the finger of the user or the like is contacted on the operation face, the finger or the like is shifted on the operation face (continuous movement on the operation face) and can be grasped on the basis of two types of information including the shifting distance and the shifting direction.

For this reason, in this specification, in a case where the same processing can be carried out by performing one of the drag operation and the flick operation, a term "continuous movement" is used as a collective term for the drag operation and the flick operation.

Then, the control unit 120 is connected to the respective units constituting the image pickup apparatus 100 and as described above too, is configured to control the respective units of the image pickup apparatus 100. That is, the control unit 120 is configured of a so-called micro computer.

The control unit 120 is configured while a CPU (central Processing Unit) 121, a ROM (Read Only Memory) 122, a RAM (Random Access Memory) 123, and an EEPROM (Electrically Erasable and Programmable ROM) 124 are mutually connected via a CPU bus 125.

The CPU 121 is configured to read and execute a program stored in the ROM 122 which will be described below, form control signals to be supplied to the respective units, supply the control signals to the respective units, accepts data and the like provided form the respective units, and process the data.

The ROM 122 previously stores and holds, as described above, various programs executed by the CPU 121 and various data and the like used for processings. The RAM 123 is used mainly as a work area for temporarily store halfway results of the various types of processings, for example.

The EEPROM 124 is so-called non-volatile memory and stores and holds information that should be held even when a power source of the image pickup apparatus 100 is turned OFF. For example, various parameters set by the user, final results of the various types of processings, processing programs and data newly provided for addition of functions or the like are held by the EEPROM 124.

To the control unit 120 thus configured, as shown in FIG. 1, the operation unit 131, the external I/F 132, the write/read unit 134, and the clock circuit 136 are connected in addition to various circuit units for realizing an image pickup function and a reproduction function of the image picked up and recorded which will be described below.

The operation unit 131 has various types of adjustment keys and function keys and operation keys such as a shutter key. The operation unit 131 accepts an operation input from the user and notifies the control unit 120 of this input. With this configuration, the control unit 120 can control the respective units in accordance with the operation input from the user which is accepted via the operation unit 131 and execute a processing in accordance with the operation input.

The external I/F 132 is, for example, a digital interface in compliance with a predetermined specification such as USB (Universal Serial Bus) or IEEE (Institute of Electrical and Electronics Engineers Inc) 1394.

That is, the external I/F 132 is configured to convert and accept data from an external device connected to the input and output terminal 133 into data in a format processable by its own device and convert and output data sent from its own device into data in a predetermined format.

The write/read unit 134 writes data into the recording medium 135 of its own device in accordance with the control of the control unit 120 and read the data recorded on the recording medium 135.

In the image pickup apparatus 100, the recording medium 135 is configured so as to be detachably mounted to the image pickup apparatus 100. For example, the recording medium 135 is a removable memory of a so-called memory card type in which a semiconductor memory is used, and a storage capacity of several gigabytes or more is provided.

It should be noted that other than the memory card type removable memory, as the recording medium 135, for example, a configuration can also be used in which the built-in recording medium such as a built-in flash memory or a small hard disk is used.

Also, as the recording medium 135, a configuration of using another removable type recording medium like an optical disk such as a DVD (digital Versatile Disc) or a CD (Compact Disc) which is of a small type can also be adopted.

The clock circuit 136 is provided with a calendar function. It is possible to provide a current year, month, and date, a current day of the week, and a current time, and also possible to realize a function of time counter for measuring a predetermined time interval as well.

With this function of the clock circuit 136, it is possible to add information related to an image pickup day such as an image pickup date and time and an image pickup day of the week to the data of the picked up image. Also, by utilizing the function of the clock circuit 136, a self timer image pickup function with which a shutter is automatically released after an elapse of a certain period of time after a predetermined operation can also be realized.

Then, in the image pickup apparatus 100 shown in FIG. 1, the lens unit 101 includes, although not shown in the drawing, an image pickup lens (objective lens), an exposure adjustment mechanism, a focus adjustment mechanism, a shutter mechanism, and the like. The lens unit 101 is a part for taking in an image of an object to be imaged on a sensor surface of an image pickup element in a later stage.

The image pickup element 102 is composed of an image pickup sensor (image pickup element) such as a CCD (Charge Coupled Device) or CMOS (Complementary Metal Oxide Semiconductor) image sensor. The image pickup element 102 takes in an image to be imaged on its own sensor surface through the lens unit 101 as an electric signal (image signal).

In the image pickup apparatus 100, the image pickup element 102 is provided with a single color filter of a color pattern previously decided so as to form any one of signals of R (red), G (green), and B (blue) for each pixel.

Then, the image signal taken in through the image pickup element 102 is supplied to the preprocessing unit 103 in a later stage. The preprocessing unit 103 includes a CDS (Correlated Double Sampling) circuit, an AGC (Automatic Gain Control) circuit, an A/D (Analog/Digital) converter, and the like. The preprocessing unit 103 is a part for taking in an image signal from the image pickup element 102 as digital data.

The image signal taken in through the preprocessing unit 103 (image data) is supplied to the image processing unit 104. The image processing unit 104 has, although not shown in the drawing, a wave detecting circuit, a white balance circuit, a de-mosaic circuit, a resolution conversion circuit, and other image correction circuits.

In the image processing unit 104, first, on the basis of the image data from the preprocessing circuit 103, parameters for the exposure (light) adjustment, parameters for the focus (focal) adjustment, parameters for the white balance adjustment, and parameters for various adjustment processings.

Among the parameters formed in the image processing unit 104, the parameters for the exposure (light) adjustment and the parameters for the focus (focal) adjustment are supplied to the control unit 120. On the basis of the parameters from the image processing unit 104, the control unit 120 controls the exposure adjustment mechanism and the focus adjustment mechanism of the lens unit 101, so that it is possible to appropriately perform the adjustments for the exposure and the focus.

Then, in the image processing unit 104, with respect to the image data from the preprocessing unit 103, a black level matching processing and the white balance adjustment processing based on the parameters for the white balance adjustment formed as described above are performed. With these adjustment processings, the adjustment is performed so that the image formed by the image data from the preprocessing unit 103 has an appropriate hue.

After this, in the image processing unit 104, with respect to the image data adjusted so as to have the appropriate hue, a de-mosaic processing for generating RGB data (three primary color data) for each pixel (simultaneity processing), an aperture correction processing, a gamma (γ) correction processing, and the like are performed.

Furthermore, in the image processing unit 104, from the formed RGB data, a Y/C conversion processing for forming a luminance signal (Y) and color signals (Cb and Cr), a correction processing of chromatic aberration, a resolution conversion processing, and the like are performed to form the luminance signal Y and the color signals Cb and Cr.

The image data formed by the image processing unit 104 (the luminance signal Y and the color signals Cb and Cr) is supplied to the display processing unit 105 and converted into an image signal in a format supplied to the display unit 106 at this time. Then, the signal is supplied to the display unit 106.

With this configuration, on the display screen of the display unit 106, the image of the object taken in through the lens unit 101 is displayed. While the user checks the image of the object displayed on the display screen of the display unit 106, it is possible to pick up the target image of the object.

At the same time, the luminance signal Y and the color signals Cb and Cr formed by the image processing unit 104 are also supplied to the compression processing unit 109. Then, at a timing when the shutter key of the operation unit 131 is pressed, the compression processing unit 109 performs a data compression on the image data of the image to be displayed at that time on the display screen of the display unit 106 and supplies this data to the control unit 120.

It should be noted that the compression processing unit 109 performs the data compression processing while following a previously decided data compression system. As the data compression system, in the case of the still image, JPEC (Joint Photographic Experts Group) system or the like is used, and in the case of the moving image, MPEG (Moving picture Experts Group) system or the like is used. The system is not limited to the above of course, and various data compression systems can be used.

The control unit 120 controls the write/read unit 134 to record the image data subjected to the data compression from the compression processing unit 109 on the recording medium 135. In this manner, in the image pickup apparatus 100, the image of the object can be picked up, and the image data forming the image of the object can be recorded on the recording medium 135.

In the image pickup apparatus 100, although a detail will be described below, the image data picked up and obtained in the above-mentioned manner can be stored in the recording medium 135 and managed in a time sequence manner (in the order of the image pickup dates) in units of corresponding folders.

The folders can be formed in accordance with purposes such as for every object and for every event. In the image pickup apparatus 100 according to the first embodiment, for example, the folders are formed for every event where the image pickup is performed such as the enrollment ceremony, the athletic festival, and the birthday party. Of course, the picked-up image data can be moved to the target folder afterwards, for example.

Then, the image data recorded on the recording medium 135 can be read out by the write/read unit 134 which is controlled by the control unit 120. The image data read out from the recording medium 135 is supplied via the control unit 120 to the extension processing unit 110.

The extension processing unit 110 performs an extension processing on the image data supplied thereto while following the data compression system used for the data compression and reconstructs the image data before the data compression to be supplied to the reduction/expansion unit 111.

The reduction/expansion unit 111 is a part for thinning out or interpolating the image data from the extension processing unit 110 in accordance with the control of the control unit 120 to reduce or expand the image formed by the relevant image data.

Also, in the case of the image data which is not subjected to neither the reduction nor the expansion, it is also possible for the reduction/expansion unit 111 not to perform the reduction processing or the expansion processing on the supplied image data with the control of the control unit 120.

Then, the reduction/expansion unit 111 forms the luminance signal Y and the color signals Cb and Cr from the image data to be output in a format supplied to the display processing unit 105 and supplies these signals to the display processing unit 105.

Similar to the case where the image data from the image processing unit 104 is processed, the display processing unit 105 converts the image signal from the display image formation unit 111 into the image signal in a format supplied to the display unit 106. Then, the display processing unit 105 supplies this signal to the display unit 106.

With this configuration, the image in accordance with the image data recorded on the recording medium 135 can be displayed on the display screen of the display unit 106. That is, it is possible to reproduce the image data of the target image recorded on the recording medium 135.

In this way, the image pickup apparatus 100 according to the first embodiment can pick up the image of the object and record the image on the recording medium 135. Also, the image pickup apparatus 100 can read out and perform the reproduction processing on the image data recorded on the recording medium 135 and also display the image in accordance with the image data on the display screen of the display unit 106.

Also, in accordance with the control of the control unit 120, the display processing unit 105 of the image pickup apparatus 100 can feed the display images forward and backward. In the below, the forward and backward feed may also referred to as scroll or screen feed in some cases.

Then, as will be described in detail also below, in a case where the image pickup apparatus 100 according to the first embodiment performs the forward or backward feed of the display images while the image of the display target is reduced by utilizing the function of the reduction/expansion unit 111.

With this configuration, the image at the scroll reaching point of the forward or backward feed and at least a part of one image among the image before the relevant image and the image after the relevant image can be checked on the one screen as efficiently as possible.

Then, eventually, the image at the scroll reaching point of the forward or backward feed can be checked on the one screen efficiently together with the image at least at a certain ratio of the image before or after the relevant image.

With this configuration, at the time of the forward or backward feed of the display images (at the time of scrolling), the image can be checked including a relation with the image before or after the relevant image, and the memory of the user at the time of the image pickup is also recalled, so that the prompt search for the target image can be facilitated.

Configuration Examples of the Image Folder and the Image File

As described above too, in the image pickup apparatus 100 according to the present embodiment, the image data obtained through the image pickup can be stored in the image folder formed on the recording medium 135 in accordance with the instruction of the user in the image pickup date and time order (the time sequence order in accordance with the image pickup date and time).

Herein, the image folder is formed, as described above too, for example, for every event where the image pickup is performed such as the enrollment ceremony, the athletic festival, and the birthday party. In addition to this, for example, the image folder corresponding to the image pickup date can also be formed.

FIG. 2 is an explanatory diagram for explaining a layout example of an image folder formed on the recording medium 135 of the image pickup apparatus 100. As shown in FIG. 2, the image folder has a folder name which is specification information for specifying the respective folders. This folder name is, for example, information corresponding to the events such as the enrollment ceremony, the athletic festival, and the birthday party where the image pickup is performed, information related to the image pickup date such as the image pickup year and month and the image pickup year, month, and date.

Also, the respective image folders have metadata of a creation date and time of the relevant image folder and other types of metadata as header information. As the metadata, in addition to automatically assignable information in the image pickup apparatus 100 such as the number of image files stored in the image folder, comment information (text information) input by the user and the like are exemplified. Other information can also be added as the metadata.

Then, for each of the image files belonging to the folder, the image folder stores the image pickup date and time, the file name, and the address on the recording medium. With this information of the image folder, it is possible to grasp when the image pickup is performed, which image files are stored in the image folder, and where those image files are stored on the recording medium.

FIG. 3 is an explanatory diagram for explaining a layout example of an image file recorded on the recording medium 135 of the image pickup apparatus 100. As shown in FIG. 3, the image file has a file name which is specification information for specifying the respective image files. This file name is automatically assigned, for example, at the image pickup time by the control unit 120, corresponding to the file names 1, 2, 3 . . . of the image folder shown in FIG. 2.

Also, the respective image files is configured to have the image pickup date and time (corresponding to the creation date and time of the relevant image file) of the image data stored in the image file and various types of metadata. As the metadata, in addition to automatically assignable information in the image pickup apparatus 100 such as the size of the file, comment information (text information) input by the user and the like are exemplified. Other information can also be added as the metadata.

Then, the image file stores image data for forming the image of the object obtained through the image pickup as the main data.

It should be noted that in the image pickup apparatus 100 according to the first embodiment, in a case where the user does not create the folder, for example, a folder corresponding to the image pickup date is automatically formed, and the image data obtained through the image pickup can be stored in this folder.

Then, as described with use of FIG. 2, in the image folder formed in the image pickup apparatus 100, the image file of the image data obtained through the image pickup is managed in the time sequence order in accordance with the image pickup date and time.

Therefore, on the basis of the information of the image folder, the image data of the image file shown in FIG. 3 can be read out in the direction of the time flow to be sequentially displayed and also be read out in the direction of the time rewinding flow to be sequentially displayed.

Display Mode of the Scroll Display According to the First Embodiment

In the image pickup apparatus 100 according to the first embodiment, by performing the continuous movement (the drag operation or the flick operation) on the operation face of the touch panel 107, it is possible to feed the display images backward and forward (the scroll for the display images).

In the image pickup apparatus 100 according to the first embodiment, the scroll for the display images is not for displaying the display images displayed on the entire surface of the display screen by simply switching the images in units of image like the scroll in the related art.

In the image pickup apparatus 100, the scroll for the display images accompanied with the reduction display of the images is performed. With this configuration, regarding the scroll target image, in a form where at least one of images before and after the scroll target image is also included, those images can be displayed and viewed as large parts as possible.

Then, in the scroll for the display images performed by the image pickup apparatus 100, eventually, together with the image at the scroll reaching point, parts of both the images before and after the relevant image at least at a predetermined amount or more can also be displayed on the one screen and viewed.

FIGS. 4A to 4C are explanatory diagrams for explaining an image display mode at the time of a display image scroll performed in the image pickup apparatus 100 according to the first embodiment. Herein, FIG. 4A schematically shows a state of an image displayed on a display screen 6G of the display unit 106. Also, FIGS. 4B to 4E show transient states at the time of the scroll for the display images.

In FIG. 4A, at the current time point, a state is established in which an image C is displayed on the display screen 6G, and the image folder to which the image C belongs shows that the image B and the image A exist in a previous stage of the image C, and the image D and the image E exist in a later stage of the image C.

That is, FIG. 4A shows a case in which the images A, B, C, D, and E are picked up in the stated order, a predetermined image folder stores the image data forming these images in the time sequence order based on the image pickup date and time, and at the current time point, the image C is displayed on the display screen 6G of the display unit 106.

Then, as shown in the center of FIG. 4A, on the operation face of the touch panel 107 of the display screen 6G on which the image C is displayed, by the finger, the stylus, or the like, as shown by the arrow, the user performs the continuous movement from the left to the right (the drag operation or the flick operation).

As described above, in a case where the contact operation from the user is accepted, the touch panel 107 sequentially supplies the coordinate data indicating the position on the operation face contacted by the finger of the user or the like to the control unit 120. On the basis of the coordinate data from the touch panel 107, the control unit 120 determines which operation is performed with respect to the operation face of the touch panel 107.

In the image pickup apparatus 100, as shown in FIG. 4A, the continuous movement with respect to the operation face of the touch panel 107 (the continuous movement with respect to the display image) instructs the scroll for the display images in a case where the image is displayed on the entire surface of the display screen 6G.

To be more specific, in the image pickup apparatus 100, the continuous movement performed by once with respect to the display image is an operation of shifting the display image in the moving direction by one image (scrolling by one image). Herein, the continuous movement performed by once means a series of operations in which the operation face is contacted by the finger or the like, the finger is moved on the operation face while keeping the contact, and thereafter the finger or the like is released from the operation face.

Then, as shown in FIG. 4A, in a case where the continuous movement is performed from the right to the left of the display screen 6G on the operation face of the touch panel 107, on the basis of the coordinate data from the touch panel 107, the control unit 120 determines that the scroll for the display images in the time rewinding direction is instructed.

Then, the control unit 120 of the image pickup apparatus 100 prepares the image data of the image which is the target of the scroll display in the RAM 123, for example. As described above, the continuous movement performed by once with respect to the display image is an operation of shifting the display image in the moving direction by one image.

Therefore, as the image at the reaching point of the scroll is the image B, and one image each before and after the image B is also the display target, the scroll target images are the image C in the display and the image B and the image A immediately before the image C.

In view of the above, the control unit 120 controls the write/read unit 134 to refer to the information of the image folder which is the display target, read out the image data of the image C, the image B, and the image A which are the scroll targets, and store these images in the RAM 123.

It should be noted that for example, in a case where the image data of the image C which is currently displayed exists in the RAM 123, the image data of the image C is not newly read out, and it is possible to use the image data of the image C existing in the RAM 123.

With this configuration, the RAM 123 temporarily stores the image data of the image C, the image B, and the image A which are the scroll targets. Then, the control unit 120 controls the extension processing unit 110, the reduction/expansion unit 111, and the display processing unit 105 to start the scroll processing of the display images which is accompanied with the reduction processing of the display images.

To be more specific, the control unit 120 supplies the image data in the order of the image C, the image B, and the image A to the extension processing unit 110. In accordance with the control of the control unit 120, the extension processing unit 110 performs the extension processing on the supplied image data which is subjected to the data compression, reconstructs the original image data before the data compression, and supplies this image data to the reduction/expansion unit 111.

In this case, the reduction/expansion unit 111 performs a thinning-out processing or the like on the supplied image data to carry out a reduction processing on the image at a rate in accordance with the control of the control unit 120, forms an image signal in a format supplied to the display processing unit 105 from the image data subjected to the reduction processing, and supplies this image signal to the display processing unit 105.

In accordance with the control of the control unit 120, from the supplied image signal, the display processing unit 105 forms an image signal for displaying the images for one screen on which the scroll target images are shifted from the left to the right on the display screen 6G, and supplies this image signal to the display unit 106.

As a result, on the display screen of the display unit 106, for example, as shown in FIG. 4B, a part of the image C which is the image at the scroll starting point and a part of the image B immediately before the image C (the image at the scroll reaching point) are displayed within the display screen 6G, and it is possible to view both of those.

In this case, the image C and the image B are both reduced, and therefore as compared with a case where the display images are simply shifted, still more of image parts can be displayed and viewed by the user.

Then, as described above, the display processing for the images through the extension processing unit 110, the reduction/expansion unit 111, and the display processing unit 105 (the scroll processing of the display images which is accompanied with the reduction processing of the display images) is repeatedly performed on the respective image data of the image C, the image B, and the image A which are the scroll targets.

In this case, the reduction processing in the reduction/expansion unit 111 is performed so that the reduction rate (reduction ratio) is set to be gradually larger, and the display images are set to be smaller images while being gradually reduced. With this configuration, while gradually scrolling (shifting the display position on the display screen), it is possible to display the display images set to be gradually reduced on the display screen 6G of the display unit 106.

It should be noted that in a case where the image data subjected to the extension processing can be held, for example, in the RAM 123, a buffer memory in the extension processing unit 110, or the like, the image data after the extension processing is used.

With this configuration, as the processing of the extension processing unit 110 is omitted, and the processing of the reduction/expansion unit 111 and the display processing unit 105 is repeatedly performed, the scroll for the display images which is accompanied with the reduction processing of the display images can be performed.

Then, as shown in FIG. 4C, the image B which is the image at the reaching point of the scroll is located at the center of the display screen 6G, and 50% or more of the image C and the image A before and after the image B are displayed on the display screen 6G. At this stage, this scroll processing is ended.

To elaborate, as shown in FIG. 4C, at the stage where the entirety of the image B at the scroll reaching point is located at the center of the display screen 6G and half or more of the image C and the image A before and after the image B are displayed on the display screen 6G, the scroll processing of the display images which is accompanied with the reduction processing of the display images is ended.

With this configuration, it is possible to perform the checking in a state where the image at the reaching point of the scroll and at least half of the images before and after the image at the scroll reaching point are displayed on the display screen 6G. Therefore, as the image at the reaching point of the scroll can be checked also including the association with the images before and after the image at the scroll reaching point. In addition, the memory of the user at the time of the image pickup is also recalled, and it is possible to facilitate the prompt search for the target image.

Then, in a case where a state of FIG. 4C is established, after maintaining this display state for a certain period of time (for example, about several hundred milliseconds to several seconds), without performing the scroll this time, the control unit 120 performs the processing of displaying the display images while being gradually expanded from the state shown in FIG. 4C.

In this case, as shown in FIG. 4C, the targets of the expansion processing are three images including the image A, the image B, and the image C displayed on the display screen 6G. For this reason, the control unit 120 controls the extension processing unit 110, the reduction/expansion unit 111, and the display processing unit 105 and performs the processing of displaying the image A, the image B, and the image C in the state shown in FIG. 4C while being gradually expanded.

In actuality, the image data of the image A, the image B, and the image C temporarily stored in the RAM 123 can also display images at a high resolution with respect to a display screen larger than the display screen 6G in accordance with a resolution of the image pickup element.

For this reason, on the contrary to the above-mentioned image reduction processing, by performing the reduction processing on the display images while a large reduction rate is used first, and smaller reduction rates are used gradually. As a result, the respective display images are expanded and displayed from the state shown in FIG. 4C.

To be more specific, the control unit 120 supplies the image data of the image A, the image B, and the image C temporarily stored in the RAM 123 to the extension processing unit 110. In accordance with the control of the control unit 120, the extension processing unit 110 performs the extension processing on the supplied image data which is subjected to the data compression, reconstructs the original image data before the data compression, and supplies this image data to the reduction/expansion unit 111.

In this case, the reduction/expansion unit 111 carries out a reduction processing on the supplied image data at a rate in accordance with the control of the control unit 120, forms an image signal in a format supplied to the display processing unit 105 from the image data subjected to the reduction processing, and supplies this image signal to the display processing unit 105.

In accordance with the control of the control unit 120, from the supplied image signal, the display processing unit 105 forms an image signal for one screen to be supplied to the display unit 106. Then, the display processing unit 105 supplies this image signal to the display unit 106.

As a result, on the display screen of the display unit 106, for example, as shown in FIG. 4D, without the scroll, the images for one screen where the display images are set to be larger from the state of FIG. 4C are displayed.

Then, as described above, the processing of expanding the display image through the extension processing unit 110, the reduction/expansion unit 111, and the display processing unit 105 is repeatedly performed on the respective image data of the image C, the image B, and the image A.

In this case, the reduction processing in the reduction/expansion unit 111 is performed so that the reduction rate is set to be gradually smaller, and the display images are set to be larger images while being gradually expanded. With this configuration, as shown from the state from FIG. 4C to FIG. 4D, it is possible to display the display images set to be gradually expanded on the display screen 6G of the display unit 106.

Then, at the stage in which the image B which is the image at the reaching point of the scroll in the case of this example is displayed while filling up the display screen 6G as shown in FIG. 4E, the control unit 120 ends the processing of expanding the display images. With this configuration, the image at the reaching point of the scroll can be displayed and viewed while filling up the display screen 6G.

It should be noted that as described above too, in a case where the image data subjected to the extension processing can be held, for example, in the RAM 123, the buffer memory in the extension processing unit 110, or the like, the image data after the extension processing is used.

With this configuration, as the processing of the extension processing unit 110 is omitted, by repeatedly performing the processing through the reduction/expansion unit 111 and the display processing unit 105, it is possible to perform the processing of expanding the display image.

Also, in the case of the example shown in FIGS. 4A to 4E, the case has been described in which by performing the continuous movement from the left to the right with respect to the operation face of the touch panel 107 on the display screen 6G, the accumulated images are scrolled in the rewinding direction of the image pickup date and time to be displayed.

In contrast to this, in a case where the continuous movement is performed from the right to the left with respect to the operation face of the touch panel 107 on the display screen 6G, it is possible to scroll the accumulated images in the proceeding direction of the image pickup date and time to be displayed.

For example, as shown in FIG. 4A, in a case where the image C is displayed on the display screen 6G, when the continuous movement is performed from the right to the left with respect to the operation face of the touch panel 107 on the display screen 6G, the image at the reaching point of the scroll is the image D.

Then, by performing the scroll processing of the display images which is accompanied with the reduction processing of the display images, the image C, the image D, and the image E are displayed in a mode shown in FIG. 4C. After this, the processing of displaying the display images while being expanded, the image D is displayed in a mode shown in FIG. 4E.

In this way, in the image pickup apparatus 100 according to the first embodiment, at the time of the scroll for the display images, as the display images are scrolled accompanied with the reduction processing on the display images, the image at the scroll reaching point and more of the part of the image before or after the image at the scroll reaching point can be displayed in the display screen. With this configuration, it is possible to check the contents of the image at the scroll reaching point and the image before or after the image at the scroll reaching point in detail.

Furthermore, eventually, the image at the scroll reaching point and more of the parts of the images before and after the image at the scroll reaching point can be displayed in the display screen. With this configuration, it is possible to grasp the temporal association among the images more clearly.

It should be noted that in the case of the example described by using FIGS. 4A to 4E, the description has been given that the continuous movement with respect to the display image is the operation of shifting the display image by one image in the moving direction (scrolling by one image). However, this is not limited to the above-mentioned configuration.

For example, in the case of the drag operation, if the finger or the like contacting the operation face is not released from the operation face even after the end of the drag operation, until the finger or the like is released, the scroll may be continued.

In this way, in a case where the scroll is continued, the reduction is not further performed beyond the state shown in FIG. 4C. This is because if the reduction is performed too much, the determination on the image is not performed. Then, in a case where only the scroll is continued, while keeping the image size shown in FIG. 4C, the display images are displayed by shifting one image each in the moving direction.

It should be noted that in this case, in order to facilitate the checking on the reduced image, the speed of the scroll is adjusted. For example, after maintaining the display for a certain period of time (for example, about several hundred milliseconds to several seconds), the image scroll is performed.

With this setting, without repeatedly performing the drag operation and the flick operation, it is possible to perform the image scroll. Of course, by repeatedly performing the short drag operation and the short flick operation, it is also possible to repeatedly perform the scroll processing of the display images which is accompanied with the reduction processing of the display images.

Detail of the Scroll Processing According to the First Embodiment

Next, a detail of the scroll processing of the display images performed in the image pickup apparatus 100 according to the first embodiment described by using FIGS. 4A to 4E will be described with reference to a flow chart of FIG. 5. FIG. 5 is a flow chart for explaining a reproduction processing on picked-up images including the scroll processing performed in the image pickup apparatus 100 according to the first embodiment.

This processing shown in FIG. 5 is, for example, a processing executed mainly by the control unit 120 in a case where a menu item called image reproduction processing (reproduction processing of the recorded images) is selected from the menu displayed on the display screen of the display unit 106.

It should be noted that, for example, in a case where a predetermined operation is performed such as a press operation on a menu key provided to the operation unit 131 of the image pickup apparatus 100, the control unit 120 controls the display processing unit 105 or the like to display the menu on the display screen of the display unit 106.

Then, when the image reproduction processing is selected from the menu, the control unit 120 executes the processing shown in FIG. 5, and first, a processing of accepting a selection input on a first image that should be displayed is performed (step S101).

To be more specific, in step S101, the control unit 120 displays, first, a view list of the image folders to accept the selection input, and displays an image view list of the image files belonging to the selected image folder to accept a selection input on images to be displayed on the one screen.

Herein, an image view list belonging to the image folder is, for example, a view list of thumbnail images regarding the images of the respective image files. The thumbnail image data for displaying the thumbnail images is, for example, previously created on the basis of the image data of the respective image files at an appropriate timing after the image pickup and stored in the individual image files although not shown in FIG. 3. Of course, when the thumbnail images are displayed, the thumbnail image data may be created on the basis of the image data of the respective image files and displayed.

After this, the control unit 120 displays the image selected in step S101 on the display screen 6G of the display unit 106 (step S102).

To be more specific, in step S102, the control unit 120 understands from which image files the respective thumbnail images on the view list are read out. In view of the above, the control unit 120 specifies the image file having the selected thumbnail image and controls the write/read unit 134 to read out the image data from the specified image file.

Then, the control unit 120 processes the read image data in the extension processing unit 110, the reduction/expansion unit 111, and the display processing unit 105 to be supplied to the display unit 106 and displays the image selected by the user on the entire surface of the display screen 6G of the display unit 106.

In this way, the processing of reading out the image data of the image selected by the user and displaying the image so as to fill up the display screen 6G of the display unit 106 (performing the one screen display of the image) is the step in step S102.

After this, the control unit 120 accepts the operation input from the user through the touch panel 107 or the operation unit 131 (step S103), and it is determined whether or not the operation input from the user is accepted (step S104). In the determination processing in step S104, when it is determined that the operation input from the user is not accepted, the control unit 120 repeatedly performs the processing from step S103.

In the determination processing in step S104, when it is determined that the operation input from the user is accepted, the control unit 120 determines whether or not the accepted operation input is the continuous movement for performing the scroll for the display images (step S105).

In the determination processing in step S105, when it is determined that the accepted operation is not the continuous movement, the control unit 120 executes the processing in accordance with the accepted operation input from the user (step S106). It should be noted that in step S106, in accordance with the operation input, for example, various processings are performed such as the expansion processing and the reduction processing on the display image and the processing for ending the image reproduction processing.

In the determination processing in step S105, when it is determined that the accepted operation is the continuous movement, the control unit 120 executes the scroll processing of the display images which is accompanied with the reduction processing of the display images described by using FIGS. 4A to 4E (step S107).

In this processing in step S107, as described above, the control unit 120 controls the write/read unit 134 to obtain image data of a plurality of images which are the display targets. Then, the control unit 120 controls the extension processing unit 110, the reduction/expansion unit 111, and the display processing unit 105 to perform the scroll processing of the display images which is accompanied with the reduction processing of the display images.

After the processing in step S107, the control unit 120 determines whether or not the scroll processing up to the state shown in FIG. 4C (transient display processing) is ended (step S108). In the determination processing in step S108, when it is determined that the scroll operation is not ended, the control unit 120 repeatedly performs the processing from step S107 to continue the scroll processing of the display images which is accompanied with the reduction processing of the display images.

In the determination processing in step S108, when it is determined that the scroll operation is ended, it is determined whether or not the contact with the touch panel 107 by the finger of the user or the like is ended (step S109).

In the determination processing in step S109, when it is determined that the contact by the finger or the like is not ended, the control unit 120 repeatedly performs the processing from step S107. It should be noted that in this case, as in the reduction processing on the display images, the processing of displaying the image while being reduced to the predetermined size shown in FIG. 4C is ended, in step S107, as described above too, only the scroll of the image with the reduced size is performed.

Also, in a case where the scroll processing in the state shown in FIG. 4C is performed, in step S108, it is determined that the scroll processing accompanied with the reduction processing on the display images is ended. Therefore, until the finger of the user or the like is released from the operation face of the touch panel 107, the loop processing from step S107 to step S109 is performed.

Also, in the determination processing in step S109, when it is determined that the contact by the finger or the like is ended, after maintaining the state after the scroll (the display state shown in FIG. 4C) for a certain period of time (for example, about several hundred milliseconds to several seconds), the control unit 120 performs the processing of displaying the display images while being gradually expanded (step S110).

Then, as shown in FIG. 4E, the control unit 120 determines whether or not the image at the reaching point of the scroll is displayed on the full screen (step S111). In the determination processing in step S111, when it is determined that the image at the reaching point of the scroll is not displayed on the full screen, the processing from step S111 is repeatedly performed to stand by until the image at the reaching point of the scroll is displayed on the full screen.

In the determination processing in step S111, when it is determined that the image at the reaching point of the scroll is displayed on the full screen, the control unit 120 repeatedly performs the processing from step S103. That is, the scroll can be further performed, and other processings can be performed.

In this manner, in the image pickup apparatus 100 according to the first embodiment, it is possible to realize the scroll processing of the display images which is accompanied with the reduction processing of the display images.

Then, as described above too, in the middle of the scroll processing, as the display image is scrolled while being reduced and displayed, it is possible to check still more parts of the plurality of images before and after the relevant image on the one screen. Also, eventually, the image at the reaching point of the scroll and more than half of the image parts of the images before and after the image at the reaching point of the scroll can be viewed on the one screen.

With this configuration, at the time of the forward or backward feed of the display images (at the time of scrolling), the image can be checked including a relation with the image before or after the relevant image, and the memory of the user at the time of the image pickup is also recalled, so that the prompt search for the target image can be facilitated.

It should be noted that according to the first embodiment, in a case where the image at the reaching point of the scroll and the images before and after the image at the reaching point of the scroll are displayed, regarding the images before and after the relevant image, at least 50% of those images are set to be displayed on the display screen 6G. However, this is not limited to the above-mentioned configuration.

For example, regarding the images before and after the image at the reaching point of the scroll, still more image parts can be displayed on the one screen such as at least 60% or 70% of those images.

However, in a case where the display ranges of the images before and after the image at the reaching point of the scroll are to be expanded, a further reduction is performed, and the display images may be difficult to view in some cases. In view of the above, in an image pickup apparatus according to a second embodiment of the present invention which will be described below, while the difficulty of viewing the image at the reaching point of the scroll is prevented, the entire images before and after the image at the reaching point of the scroll can also be displayed on the one screen to be checked.

Second Embodiment

Next, an image pickup apparatus according to a second embodiment of the present invention will be described. The image pickup apparatus according to the second embodiment is also the image pickup apparatus 100 having the configuration described by using FIG. 1. Then, in the image pickup apparatus 100 according to the second embodiment too, the image data obtained through the image pickup is managed, as described with use of FIGS. 2 and 3, for every folder, and for every image pickup date and time. In view of the above, the image pickup apparatus 100 according to the second embodiment will be also described with reference to FIG. 1.

The image pickup apparatus 100 according to the second embodiment performs, similarly as in the image pickup apparatus according to the first embodiment described above, the scroll processing of the display images which is accompanied with the reduction processing of the display images, but the display mode is different from the first embodiment.

In the case of the scroll display in the image pickup apparatus according to the first embodiment described above, eventually, as shown in FIG. 4C, together with the image at the scroll reaching point, parts of both the images before and after the relevant image at least at a predetermined amount or more are also displayed on the one screen.

In contrast to this, the scroll display in the image pickup apparatus 100 according to the second embodiment displays, eventually, together with the image at the scroll reaching point, all of the images before and after the image at the scroll reaching point on the one screen. Also, in this case, measurements are also taken against the difficulty of viewing the image at the reaching point of the scroll.

Display Mode of the Scroll Display According to the Second Embodiment

FIGS. 6A to 6D are explanatory diagrams for explaining an image display mode at the time of a display image scroll performed in the image pickup apparatus 100 according to the second embodiment. To elaborate, FIGS. 6A to 6D show transient states at the time of the scroll for the display images.

In the image pickup apparatus 100 according to the second embodiment too, as described with use of FIG. 4A, at the current time point, a state is established in which the image C is displayed on the display screen 6G, and for the image folder to which the image C belongs, the image B and the image A exist in a previous stage of the image C, and the image D and the image E exist in a later stage of the image C.

Then, as shown in the center of FIG. 4A, on the operation face of the touch panel 107 of the display screen 6G on which the image C is displayed, by the finger, the stylus, or the like, as shown by the arrow, the user performs the continuous movement from the left to the right (the drag operation or the flick operation).

In this case, on the basis of the coordinate data indicating the contact position in accordance with the contact operation from the touch panel 107 by the user on the operation face, the control unit 120 of the image pickup apparatus 100 determines which operation is performed with respect to the operation face of the touch panel 107.

In the image pickup apparatus 100 according to the second embodiment too, the continuous movement with respect to the operation face of the touch panel 107 (the continuous movement with respect to the display image) in a case where the image is displayed on the entire surface of the display screen 6G instructs to feed the display images backward and forward.

That is, in the image pickup apparatus 100 according to the second embodiment too, the continuous movement performed by once with respect to the display image is an operation of shifting the display image in the moving direction by one image (scrolling by one image).

Therefore, as shown in FIG. 4A, in a case where the continuous movement is performed from the right to the left of the display screen 6G on the operation face of the touch panel 107, on the basis of the coordinate data from the touch panel 107, the control unit 120 determines that the scroll for the display images in the time rewinding direction is instructed.

In this case, the control unit 120 prepares, similarly as in the case of the first embodiment described above, the image data of the image which is the target of the scroll display in the RAM 123. That is, as shown in FIG. 4A, in a case where the continuous movement is performed from the left to the right with respect to the operation face of the touch panel 107 in a state in which the image C is displayed, the display image is shifted by one in the right direction. Therefore, the images which are the scroll display in this case are the image C, the image B, and the image A.

In view of the above, the control unit 120 temporarily stores and prepares, similarly as in the case of the first embodiment described above, the respective image data of the image C, the image B, and the image A in the RAM 123. Then, the control unit 120 controls, similarly as in the case according to the first embodiment described above, the extension processing unit 110, the reduction/expansion unit 111, and the display processing unit 105 to start the scroll processing of the display images which is accompanied with the reduction processing of the display images.

Figure 6B:
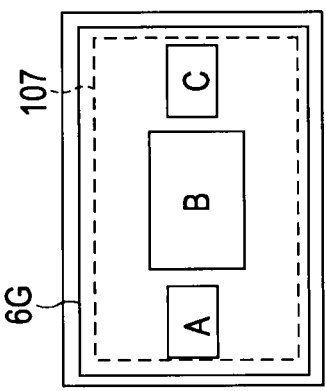
FIGS. 6A to 6D are explanatory diagrams for explaining an image display mode at the time of a display image scroll performed in an image pickup apparatus according to a second embodiment of the present invention.
Figure 6D:
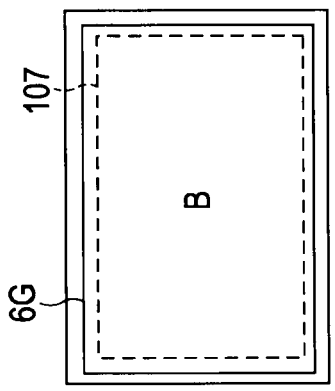
Figure 6A:
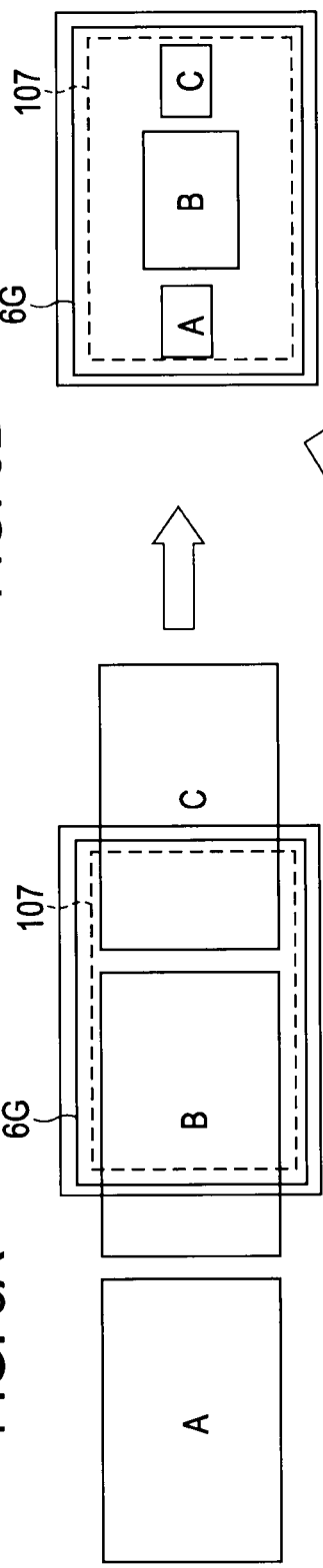

As a result, on the display screen of the display unit 106, for example, as shown in FIG. 6A, a part of the image C which is the image at the scroll starting point and a part of the image B immediately before the image C (the image at the scroll reaching point) are displayed within the display screen 6G, and it is possible to view both of those.

In this case, the image C and the image B are both reduced, and therefore as compared with a case where the display images are simply shifted, still more of image parts can be displayed and viewed by the user.

Then, as described above, the scroll processing of the display images through the extension processing unit 110, the reduction/expansion unit 111, and the display processing unit 105 which is accompanied with the reduction processing of the display images is repeatedly performed on the respective image data of the image C, the image B, and the image A.

In this case, the reduction processing in the reduction/expansion unit 111 is performed so that the reduction rate is set to be gradually larger, and the display images are set to be smaller images while being gradually reduced. With this configuration, while gradually scrolling (shifting the display position on the display screen), it is possible to display the display images set to be gradually reduced on the display screen 6G of the display unit 106.

It should be noted that in a case where the image data subjected to the extension processing can be held, for example, in the RAM 123, the buffer memory in the extension processing unit 110, or the like, the image data after the extension processing may of course be used.

Then, eventually, as shown in FIG. 6B, the image at the scroll reaching point (the image B) and the images before and after the image at the scroll reaching point (the image C and the image A) are all displayed on the one screen. Also, the image at the scroll reaching point (the image B) is set larger, as shown in FIG. 6B, than the images before and after the image at the scroll reaching point.

This arrangement can be coped with by setting different reduction rates for the image at the reaching point of the scroll and the images before and after the image at the scroll reaching point in the reduction/expansion unit 111. To elaborate, by setting the reduction rate for the image at the reaching point of the scroll smaller than that for the images before and after the image at the scroll reaching point, the image at the reaching point of the scroll may be displayed larger than the images before and after the image at the scroll reaching point.

Then, as shown in FIG. 6B, at the stage where the entirety of the image B at the scroll reaching point is located at the center of the display screen 6G and all of the image C and the image A are displayed on the display screen 6G, the scroll processing of the display images which is accompanied with the reduction processing of the display images is ended.

With this configuration, it is possible to perform the checking in a state where a whole image at the scroll reaching point and all of the images before and after the image at the scroll reaching point are displayed on the display screen 6G. Therefore, as the image at the reaching point of the scroll can be checked also including the association with the images before and after the image at the scroll reaching point. In addition, the memory of the user at the time of the image pickup is also recalled, and it is possible to facilitate the prompt search for the target image.

Also, even when the three continuous images are displayed on the same screen in the time sequence order in accordance with the image pickup date and time, the image at the reaching point of the scroll is displayed larger than the images before and after the image at the scroll reaching point. Thus, an inconvenience is not caused that the image at the scroll reaching point that should be paid attention to becomes difficult to view.

Then, when the state shown in FIG. 6B is established, after maintaining this display state for a certain period of time (for example, about several hundred milliseconds to several seconds), without performing the scroll this time, the control unit 120 performs the processing of displaying the display images while being gradually expanded from the state shown in FIG. 6B.

In this case, as shown in FIG. 6B, the targets of the expansion processing are three images including the image A, the image B, and the image C displayed on the display screen 6G. For this reason, similarly as in the image pickup apparatus according to the first embodiment described above, the control unit 120 controls the extension processing unit 110, the reduction/expansion unit 111, and the display processing unit 105 and performs the processing of displaying the image A, the image B, and the image C while being gradually expanded in the state shown in FIG. 6B.

Then, as described above, the processing of expanding the display image through the extension processing unit 110, the reduction/expansion unit 111, and the display processing unit 105 is repeatedly performed on the respective image data of the image C, the image B, and the image A.

In this case, the reduction processing in the reduction/expansion unit 111 is performed so that the reduction rate is set to be gradually smaller, and the display images are set to be larger images while being gradually expanded. Also, in the processing in the reduction/expansion unit 111, the reduction rates for the image at the reaching point of the scroll and the images before and after the image at the scroll reaching point are set different from each other.

Figure 6C:
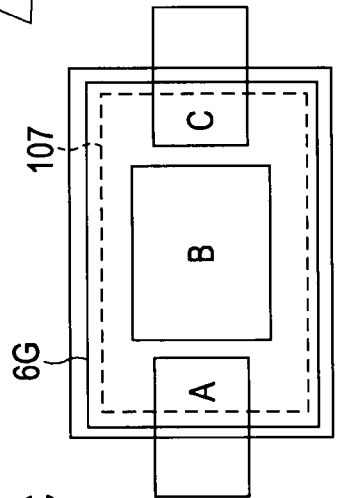

With this configuration, as shown from the state from FIG. 6B to FIG. 6C, without the scroll, it is possible to display the display images set to be gradually expanded on the display screen 6G of the display unit 106.

Then, at the stage in which the image B which is the image at the reaching point of the scroll in the case of this example is displayed while filling up the display screen 6G as shown in FIG. 6D, the control unit 120 ends the processing of expanding the display images. With this configuration, the image at the reaching point of the scroll can be displayed and viewed while filling up the display screen 6G.

It should be noted that as described above too, in a case where the image data subjected to the extension processing can be held, for example, in the RAM 123, the buffer memory in the extension processing unit 110, or the like, the image data after the extension processing may be used.

Also, in the case of the example shown in FIGS. 6A to 6D, the case has been described in which by performing the continuous movement from the left to the right with respect to the operation face of the touch panel 107 on the display screen 6G, the accumulated images are scrolled in the rewinding direction of the image pickup date and time to be displayed.

In contrast to this, in a case where the continuous movement is performed from the right to the left with respect to the operation face of the touch panel 107 on the display screen 6G, it is possible to scroll the accumulated images in the proceeding direction of the image pickup date and time to be displayed.

For example, as shown in FIG. 4A, in a case where the image C is displayed on the display screen 6G, when the continuous movement is performed from the right to the left with respect to the operation face of the touch panel 107 on the display screen 6G, the image at the reaching point of the scroll is the image D.

Then, by performing the scroll processing of the display images accompanied with the reduction processing on the display images, the image C, the image D, and the image E are displayed in a mode shown in FIG. 6B. After this, the processing of displaying the display images while being expanded, the image D is displayed in a mode shown in FIG. 6D.

In this way, in the image pickup apparatus 100 according to the second embodiment, at the time of the scroll for the display images, as the display images are scrolled accompanied with the reduction processing on the display images, the image at the scroll reaching point and more of the part of the image before or after the image at the scroll reaching point can be displayed in the display screen. With this configuration, it is possible to check the contents of the image at the scroll reaching point and the image before or after the image at the scroll reaching point in detail.

Eventually, it is possible to display the entire image at the scroll reaching point and all of the images before and after the image at the scroll reaching point on the display screen. With this configuration, it is possible to grasp the temporal association among the images more clearly.

Also, as the image at the scroll reaching point is displayed larger than the images before and after the image at the scroll reaching point on the display screen, even when a large number of images are displayed on the display screen, it is possible to avoid the difficulty in viewing the image that should be paid attention to.

It should be noted that in the case of the example described by using FIGS. 6A to 6D, the description has been given that the continuous movement with respect to the display image is the operation of shifting the display image by one image in the moving direction (scrolling by one image). However, this is not limited to the above-mentioned configuration.

For example, in the case of the drag operation, if the finger or the like contacting the operation face is not released from the operation face even after the end of the drag operation, until the finger or the like is released, the scroll may be continued.

In this way, in a case where the scroll is continued, the reduction is not further performed beyond the state shown in FIG. 6B. This is because if the reduction is performed too much, the determination on the image is not performed. Then, in a case where only the scroll is continued, while maintaining the image size shown in FIG. 6C, the display images are displayed by shifting one image each in the moving direction.

Therefore, in the case of the examples shown in FIG. 4A and FIGS. 6A to 6D, the image on the large display located at the center of the display screen 6G and the images on the small display are sequentially moved in the moving direction.

Such a display processing can be performed, as described above too, while the control unit 120 controls the write/read unit 134, the extension processing unit 110, the reduction/expansion unit 111, and the display processing unit 105.

It should be noted that in the case of such a scroll display, in order to facilitate the checking on the reduced image, the speed of the scroll is adjusted. For example, after maintaining the display for a certain period of time (for example, about several hundred milliseconds to several seconds), the image scroll is performed.

With this setting, without repeatedly performing the drag operation and the flick operation, it is possible to perform the image scroll. Of course, by repeatedly performing the short drag operation and the short flick operation, it is also possible to repeatedly perform the scroll processing of the display images which is accompanied with the reduction processing of the display images.

Detail of the Scroll Display Processing According to the Second Embodiment

Figure 7:
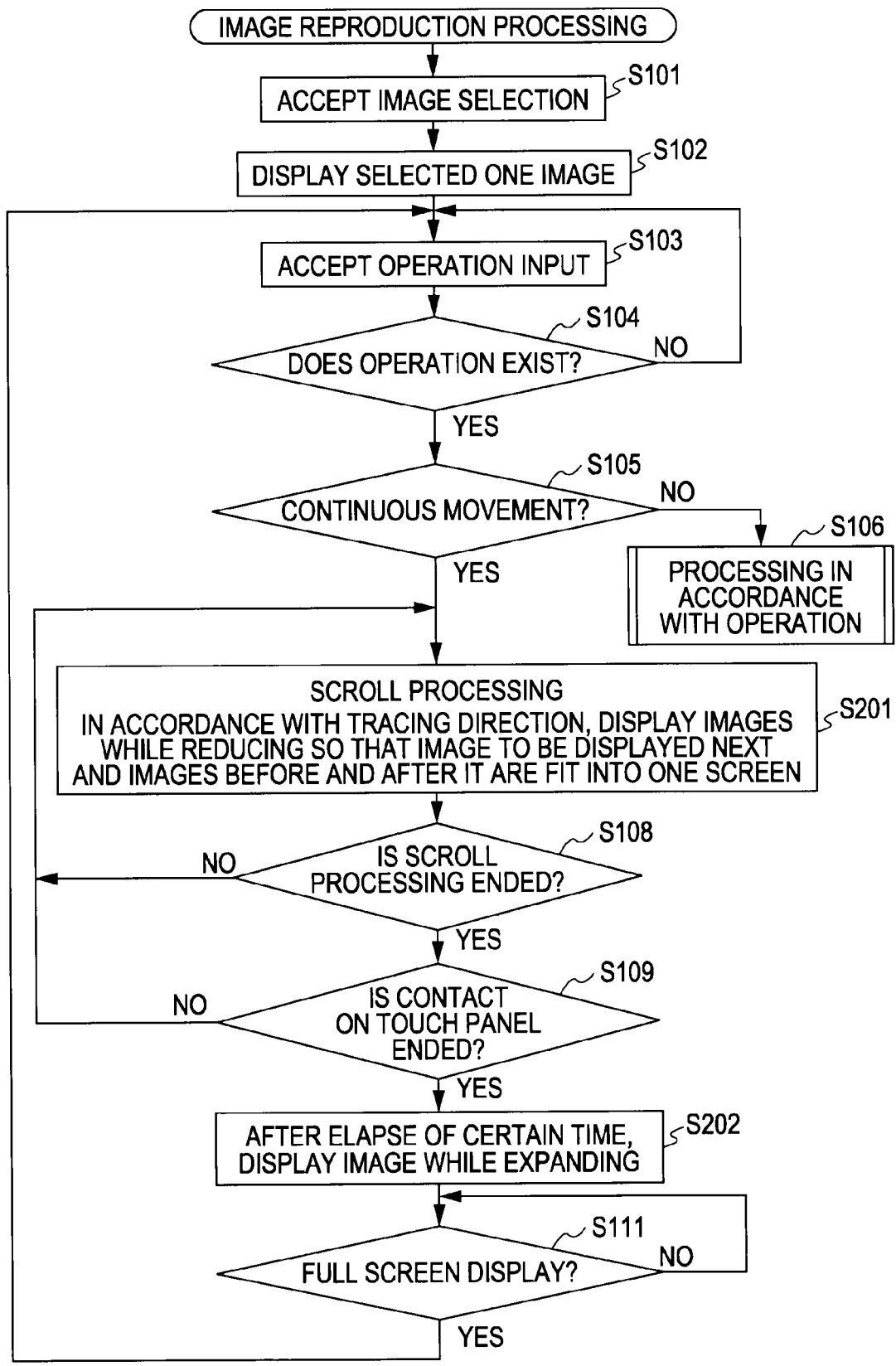
FIG. 7 is a flow chart for explaining a reproduction processing on picked-up images including the scroll processing performed in the image pickup apparatus according to the second embodiment.

Next, a detail of the scroll processing of the display images performed in the image pickup apparatus 100 according to the second embodiment which has been described by using FIGS. 6A to 6D will be described with reference to a flow chart of FIG. 7. FIG. 7 is a flow chart for explaining a reproduction processing on picked-up images including the scroll processing performed in the image pickup apparatus 100 according to the second embodiment.

This processing shown in FIG. 7 is, similarly as in the case of the image reproduction processing according to the first embodiment shown in FIG. 5, a processing executed mainly by the control unit 120 in a case where a menu item called image reproduction processing (reproduction processing of the recorded images) is selected from the menu displayed on the display screen of the display unit 106.

Then, basically, this processing shown in FIG. 7 is also performed similarly as in the image reproduction processing in the image pickup apparatus according to the first embodiment described by using FIG. 5. For this reason, in the flow chart shown in FIG. 7, the same reference symbol is assigned to the step where the same processing as that in the flow chart shown in FIG. 5 is performed, and a detailed description on that part will be omitted to avoid the repetition.

Then, in the image pickup apparatus 100 according to the second embodiment, when the image reproduction processing is selected, the control unit 120 executes the processing shown in FIG. 7. Then, the control unit 120 proceeds the processing similarly as in the image pickup apparatus according to the first embodiment described above.

That is, the control unit 120 proceeds the processing in such a manner of the image selection acceptance processing (step S101)→the processing of displaying the one selected image (step S102)→the operation input acceptance (step S103)→the determination whether or not the operation input exists (step S104).

In the determination processing in step S104, in a case where it is determined that the operation input from the user is accepted, the control unit 120 determines whether or not the accepted operation input is the continuous movement (step S105).

In the determination processing in step S105, when it is determined that the accepted operation is not the continuous movement, the control unit 120 executes the processing in accordance with the accepted operation input from the user (step S106).

In the determination processing in step S105, when it is determined that the accepted operation is the continuous movement, the control unit 120 executes the scroll processing of the display images which is accompanied with the reduction processing of the display images described by using FIG. 4A and FIGS. 6A to 6D (step S201).

In this processing in step S201, as described above, the control unit 120 controls the write/read unit 134 to obtain image data of a plurality of images which are the display targets. Then, the control unit 120 controls the extension processing unit 110, the reduction/expansion unit 111, and the display processing unit 105 to perform the scroll processing of the display images which is accompanied with the reduction processing of the display images.

It should be noted that in the processing in step S201, eventually, the image at the reaching point of the scroll and the images before and after the image at the scroll reaching point are displayed on the one screen, and also the image at the reaching point of the scroll is displayed as a larger image than the images before and after the relevant image.

After this, the control unit 120 determines whether or not the scroll processing is ended (step S108) and determines whether or not the contact by the user on the touch panel 107 is ended (step S109).

It should be noted that in the determination processing in step S108, when it is determined that the scroll processing is not ended, the control unit 120 continues the scroll processing in step S201.

Also, in the determination processing in step S109, when it is determined that the contact on the touch panel is not ended, the processing from step S201 is performed, but in this case, only the scroll for the display images in the display mode shown in FIG. 6B is performed.

On the other hand, in the determination processing in step S109, when it is determined that the scroll processing is ended, after maintaining the display state shown in FIG. 6B for a certain period of time (for example, about several hundred milliseconds to several seconds), the control unit 120 performs the processing of displaying the display images while being gradually expanded (step S202).

This processing in step S202 is almost similar to the processing in step S110 shown in FIG. 5, but a difference resides in that the reduction rate for the image at the reaching point of the scroll is different from that for the images before and after the image at the scroll reaching point.

Then, as shown in FIG. 6D, the control unit 120 stands by until the image at the reaching point of the scroll is displayed on the full screen (step S111). When the image at the reaching point of the scroll is displayed on the full screen, the control unit 120 repeatedly performs the processing from step S103.

In this manner, in the image pickup apparatus 100 according to the second embodiment, it is possible to realize the scroll processing of the display images which is accompanied with the reduction processing of the display images.

Then, as described above too, in the middle of the scroll processing, as the display image is scrolled while being reduced and displayed, it is possible to check still more parts of the plurality of images before and after the relevant image on the one screen.

Also, eventually, the image at the reaching point of the scroll and all of the images before and after the image at the scroll reaching point can be viewed on the one screen. In this case, the image at the reaching point of the scroll is displayed larger than the images before and after the image at the scroll reaching point. Thus, the difficulty in viewing the image that should be paid attention to is avoided, and it is possible to check the images including the association with the images before and after the image at the scroll reaching point.

Therefore, at the time of the forward or backward feed of the display images (at the time of scrolling), the image can be checked including a relation with the image before or after the relevant image, and the memory of the user at the time of the image pickup is also recalled, so that the prompt search for the target image can be facilitated.

Incidentally, according to the first and second embodiments described above, the continuous movement performed by once is the operation of shifting the display image by one image in the moving direction (scrolling by one image). However, through the continuous movement performed by once, such a case may be adopted that a scroll for a plurality of display images is performed.

In view of the above, in an image pickup apparatus according to a third embodiment of the present invention which will be described below, in accordance with a mode of the continuous movement, the reduction rate and the scroll amount for the display image (feeding forward or backward by how many images) can be controlled.

Third Embodiment

Next, an image pickup apparatus according to a third embodiment of the present invention will be described. The image pickup apparatus according to the third embodiment is also the image pickup apparatus 100 having the configuration described by using FIG. 1. Then, in the image pickup apparatus 100 according to the third embodiment too, the image data obtained through the image pickup is managed, as described with use of FIGS. 2 and 3, for every folder and for every image pickup date and time. For this reason, the image pickup apparatus 100 according to the third embodiment also will be described with reference to FIG. 1 as well.

Then, the image pickup apparatus 100 according to the third embodiment performs, similarly as in the image pickup apparatus according to the first embodiment described above, the scroll processing of the display images which is accompanied with the reduction processing of the display images.

However, in the image pickup apparatus 100 according to the third embodiment, in accordance with at least one of the distance and speed of the continuous movement with respect to the operation face of the touch panel 107, the reduction rate and the scroll amount for the display image at the time of the scroll processing (image feeding forward or backward amount) are controlled.

Display Mode of the Scroll Display According to the Third Embodiment

FIGS. 8A to 8G are explanatory diagrams for explaining an image display mode at the time of a display image scroll performed in the image pickup apparatus 100 according to the third embodiment. To elaborate, FIGS. 8A to 8G show transient states at the time of the scroll for the display images.

In the image pickup apparatus 100 according to the third embodiment too, as described with use of FIG. 4A, at the current time point, a state is established in which the image C is displayed on the display screen 6G. Then, in the image folder to which the image C belongs, in a previous stage of the image C, a plurality of images such as the image B, the image A, an image Z, an image Y, an image X, and an image W, . . . exist. Also, in a later stage of the image C, a plurality of images such as the image D, the image E, an image F, an image G, . . . exist.

Then, as shown in the center of FIG. 4A, on the operation face of the touch panel 107 of the display screen 6G on which the image C is displayed, by the finger, the stylus, or the like, as shown by the arrow, the user performs the continuous movement from the left to the right (the drag operation or the flick operation).

In this case, on the basis of the coordinate data indicating the contact position in accordance with the contact operation from the touch panel 107 by the user on the operation face, the control unit 120 of the image pickup apparatus 100 determines which operation is performed with respect to the operation face of the touch panel 107.

In the image pickup apparatus 100 according to the third embodiment too, as shown in FIG. 4A, in a case where the image is displayed on the entire surface of the display screen 6G, the continuous movement with respect to the operation face of the touch panel 107 (the continuous movement with respect to the display image) is designed to feed the display images backward and forward.

Then, in the image pickup apparatus 100 according to the third embodiment, on the basis of at least one of the distance and speed of the continuous movement performed with respect to the operation face of the touch panel 107, the reduction rate and the scroll amount for the display image at the time of the scroll processing are decided.

Herein, the distance of the continuous movement means a length (distance) moved on the operation face of the touch panel through the continuous movement. Also, the speed of the continuous movement is calculated by dividing the distance of the continuous movement by a period of time for the continuous movement (a time during which the finger or the like is contacted with the operation face and moved.

For this reason, the control unit 120 of the image pickup apparatus 100 can detect the distance of the continuous movement on the basis of the coordinate data changing in accordance with the continuous movement from the touch panel 107.

Also, the control unit 120 of the image pickup apparatus 100 can detect a time from the start to the end of the continuous movement as a time for the continuous movement through the clock circuit 136. To be more specific, a moving time from the time point when the supply of the coordinate data from the touch panel 107 is started to the time point when the change in the coordinate data changing in accordance with the continuous movement is ended is detected as the duration for the continuous movement.

With this configuration, the control unit 120 of the image pickup apparatus 100 can calculate the speed of the continuous movement from the distance of the continuous movement and the duration for the continuous movement which can be detected as described above.

Then, as shown in the center of FIG. 4A, when a state is established that the image C is displayed on the entire surface of the display screen 6G, it is supposed that the continuous movement is performed from the right to the left of the display screen 6G on the operation face of the touch panel 107.

In this case, the control unit 120 of the image pickup apparatus 100 according to the third embodiment too determines that the scroll for the display images in the time rewinding direction is instructed on the basis of the coordinate data from the touch panel 107.

Furthermore, as described above, on the basis of the coordinate data changing in accordance with the continuous movement from the touch panel 107, the control unit 120 detects the distance of the continuous movement and also uses the function of the clock circuit 136 to detect the speed of the continuous movement as well.

Then, on the basis of at least one of the distance and speed of the continuous movement, the control unit 120 decides the reduction rate and the scroll amount for the display image at the time of the scroll. Herein, for simplifying the description, on the basis of one of the distance of the continuous movement and the speed of the continuous movement, a description will be given of a case of deciding the reduction rate and the scroll amount for the display image at the time of the scroll.

Figure 8A:
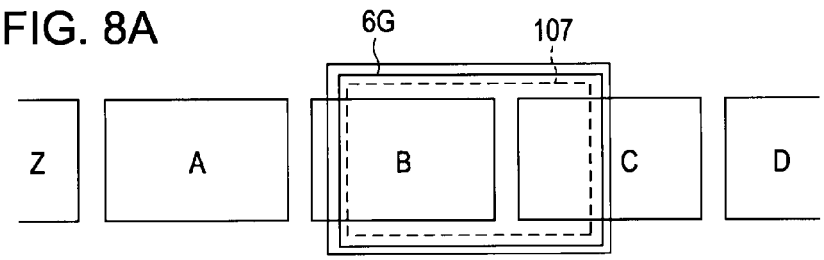
FIGS. 8A to 8G are explanatory diagrams for explaining an image display mode at the time of a display image scroll performed in an image pickup apparatus according to a third embodiment of the present invention.
Figure 8B:
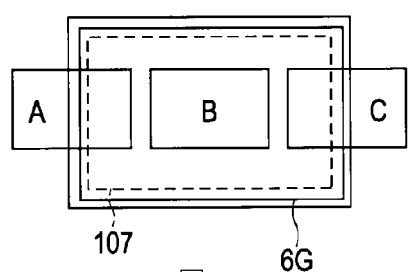

In a case where the distance of the continuous movement is equal to or smaller than a previously decided threshold or a case where the speed of the continuous movement is equal to or smaller than a previously decided threshold, the control unit 120 realizes the display of the reduction rate and the scroll amount for the display image as shown in FIG. 8B.

That is, the final reduction rate of the display image in this case is set as a reduction rate at which at least 50% of image parts of the images before and after the relevant image may be displayed in a state in which the image at the reaching point of the scroll is displayed at the center of the display screen.

Also, the scroll amount in this case is set as an amount at which the display image is shifted by one image in the direction of the continuous movement (scroll by one image). In the case of this example, the scroll amount is one image for changing the image from the image C to the image B.

Then, similarly as in the case of the first embodiment, the control unit 120 can determine that the image at the reaching point of the scroll is the image B and the scroll targets are the three images including the image A and the image C before and after the image B.

Then, similarly as in the case of the first embodiment described above, the control unit 120 prepares the image data of the image C, the image B, and the image A which are the scroll targets in the RAM 123. Then, similarly as in the case of the first embodiment described above, the control unit 120 controls the extension processing unit 110, the reduction/expansion unit 111, and the display processing unit 105 to start the scroll processing of the display images which is accompanied with the reduction processing of the display images.

As a result, on the display screen of the display unit 106, for example, as shown in FIG. 8A, a part of the image C which is the image at the scroll starting point and a part of the image B immediately before the image C (the image at the scroll reaching point) are displayed within the display screen 6G, and it is possible to view both of those.

In this case, the image C and the image B are both reduced, and therefore as compared with a case where the display images are simply shifted, still more of image parts can be displayed and viewed by the user.

Then, as described above, the scroll processing of the display images through the extension processing unit 110, the reduction/expansion unit 111, and the display processing unit 105 which is accompanied with the reduction processing of the display images is repeatedly performed on the respective image data of the image C, the image B, and the image A.

In this case, the reduction processing in the reduction/expansion unit 111 is performed so that the reduction rate is set to be gradually larger, and the display images are set to be smaller images while being gradually reduced. With this configuration, while gradually scrolling (shifting the display position on the display screen), it is possible to display the display images set to be gradually reduced on the display screen 6G of the display unit 106.

Therefore, as shown in FIG. 8B, the control unit 120 displays the image B at the center of the display screen 6G and also displays at least 50% of the image C and the image A before and after the image B on the display screen 6G. At this stage, this scroll processing is ended.

With this configuration, it is possible to perform the checking in a state where the image at the reaching point of the scroll and at least half of the images before and after the image at the scroll reaching point are displayed on the display screen 6G. Therefore, as the image at the reaching point of the scroll can be checked also including the association with the images before and after the image at the scroll reaching point. In addition, the memory of the user at the time of the image pickup is also recalled, and it is possible to facilitate the prompt search for the target image.

Then, similarly as in the case of the first embodiment described above, after maintaining the display state shown in FIG. 8B for a certain period of time (for example, about several hundred milliseconds to several seconds), without performing the scroll this time, the control unit 120 performs the processing of displaying the display image while being gradually expanded from the state shown in FIG. 8B.

In this case, the reduction processing in the reduction/expansion unit 111 is performed so that the reduction rate is set to be gradually smaller, and the display images are set to be larger images while being gradually expanded. With this configuration, as shown from the state from FIG. 8B to FIG. 8C, it is possible to display the display images set to be gradually expanded on the display screen 6G of the display unit 106.

Then, as described above, the processing of expanding the display image through the extension processing unit 110, the reduction/expansion unit 111, and the display processing unit 105 is repeatedly performed on the respective image data of the image C, the image B, and the image A.

Figure 8E:
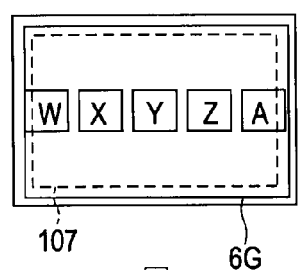
Figure 8C:
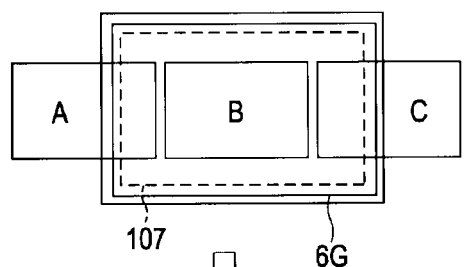
Figure 8F:
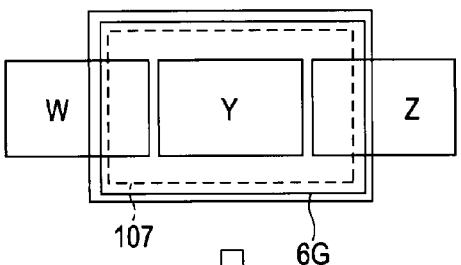
Figure 8D:
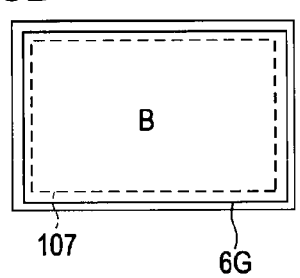

Then, at the stage in which the image B which is the image at the reaching point of the scroll in the case of this example is displayed while filling up the display screen 6G as shown in FIG. 8D, the control unit 120 ends the processing of expanding the display images. With this configuration, the image at the reaching point of the scroll can be displayed and viewed while filling up the display screen 6G.

In this way, in a case where the distance of the continuous movement is equal to or smaller than a previously decided threshold or a case where the speed of the continuous movement is equal to or smaller than a previously decided threshold, the image pickup apparatus 100 according to the third embodiment performs the scroll processing similar to that performed by the image pickup apparatus according to the first embodiment described above.

Also, as shown in the center of FIG. 4A, when a state is established that the image C is displayed on the entire surface of the display screen 6G, it is supposed that the continuous movement is performed from the right to the left of the display screen 6G on the operation face of the touch panel 107.

In this case, in a case where the detected distance of the continuous movement is larger than the previously decided threshold or a case where the detected speed of the continuous movement is faster than the previously decided threshold, the reduction rate is set further smaller, and also the scroll amount is set further larger.

To be more specific, in a case where the distance of the continuous movement is longer than the previously decided threshold or a case where the speed of the continuous movement is faster than the previously decided threshold, the control unit 120 realizes the display of the reduction rate and the scroll amount for the display image as shown in FIG. 8E.

That is, the final reduction rate of the display image in this case is set as a reduction rate at which all of total five images before and after the relevant image may be displayed within the display screen 6G in a state in which the image at the reaching point of the scroll is displayed at the center of the display screen.

Also, the scroll amount in this case is set as an amount at which the display images are shifted by four images in the direction of the continuous movement (scrolling by four images). That is, in the case of this example, the scroll amount is four images for the change from the image C to the image Y.

Then, the control unit 120 can determine that the image at the reaching point of the scroll is the image Y, and the scroll targets are the seven images of the image C, the image B, the image A, the image Z, the image Y, the image X, and the image W.

Then, similarly as in the case of the first embodiment described above, the control unit 120 prepares the image data of the image C, the image B, the image A, the image Z, the image Y, the image X, and the image W which are the scroll display targets in the RAM 123.

Then, similarly as in the case of the first embodiment described above, the control unit 120 controls the extension processing unit 110, the reduction/expansion unit 111, and the display processing unit 105 to start the scroll processing of the display images which is accompanied with the reduction processing of the display images.

As a result, on the display screen of the display unit 106, for example, as shown in FIG. 8A, a part of the image C which is the image at the scroll starting point and a part of the image B immediately before the image C (the image at the scroll reaching point) are displayed within the display screen 6G, and it is possible to view both of those.

In this case, the image C and the image B are both reduced, and therefore as compared with a case where the display images are simply shifted, still more of image parts can be displayed and viewed by the user.

Then, as described above, the scroll processing of the display images through the extension processing unit 110, the reduction/expansion unit 111, and the display processing unit 105 which is accompanied with the reduction processing of the display images is repeatedly performed on the respective image data of the image C, the image B, the image A, the image Z, the image Y, the image X, and the image W.

In this case, the reduction processing in the reduction/expansion unit 111 is performed so that the reduction rate is set to be gradually larger, and the display images are set to be smaller images while being gradually reduced. Also, the reduction rate of the image is set larger as compared with a case in which the distance and the speed of the continuous movement shown in FIGS. 8A, 8B, 8C, and 8D are equal to or smaller than the predetermined thresholds.

With this configuration, while gradually scrolling (shifting the display position on the display screen), it is possible to display the display images set to be gradually reduced on the display screen 6G of the display unit 106.

Then, as shown in FIG. 8E, the control unit 120 displays the image Y which is the image at the scroll reaching point at the center of the display screen 6G and also displays the two images each before and after the image Y (the image W, the image X, the image Z, and the image A). At this stage, this scroll processing is ended.

With this configuration, it is possible to perform the checking in a state in which the image at the reaching point of the scroll and the two images each before and after the image at the reaching point are displayed on the display screen 6G. Therefore, the image at the reaching point of the scroll can be checked including the association with the two images each before and after the image at the reaching point.

That is, the picked up continuous images can be checked on the one screen in a still longer period of the image pickup date and time, and the memory of the user at the time of the image pickup is also easily recalled. Accordingly, it is possible to facilitate the prompt search for the target image.

Then, similarly as in the case of the first embodiment described above, after maintaining the display state shown in FIG. 8E for a certain period of time (for example, about several hundred milliseconds to several seconds), without performing the scroll this time, the control unit 120 performs the processing of displaying the display image while being gradually expanded from the state shown in FIG. 8E.

In this case, the reduction processing in the reduction/expansion unit 111 is performed so that the reduction rate is set to be gradually smaller, and the display images are set to be larger images while being gradually expanded. With this configuration, as shown from the state from FIG. 8E to FIG. 8F, it is possible to display the display images set to be gradually expanded on the display screen 6G of the display unit 106.

Then, as described above, the processing of expanding the display image through the extension processing unit 110, the reduction/expansion unit 111, and the display processing unit 105 is repeatedly performed on the respective image data of the image C, the image B, and the image A.

Figure 8G:
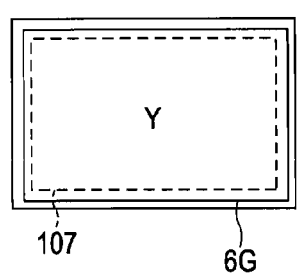

Then, the image Y which is the image at the reaching point of the scroll in the case of this example is displayed while filling up the display screen 6G as shown in FIG. 8G, the control unit 120 ends the processing of expanding the display images. With this configuration, the image at the reaching point of the scroll can be displayed and viewed while filling up the display screen 6G.

In this way, in a case where the distance of the continuous movement is longer than the previously decided threshold or a case where the speed of the continuous movement is faster than the previously decided threshold, the image pickup apparatus 100 according to the third embodiment can increase the number of images that can be displayed on the one screen.

That is, in this case, by setting the display image smaller while the reduction rate of the display image is set even larger and furthermore the scroll amount is also set larger, it is possible to increase the number of images that can be displayed on the one screen.

With this configuration, the user can display more images continuous on the image pickup date and time on the one screen and search for the target image while recalling the memory at the time of the image pickup.

Then, in the case of the image pickup apparatus 100 according to the third embodiment, as described above, in accordance with the distance and the speed of the continuous movement, it is possible to decide the reduction rate of the display image and the scroll amount of the display images.

Therefore, in accordance with the state of the displayed images, the user adjusts the continuous movement performed with respect to the operation face of the touch panel 107 by itself and decides the reduction rate and the scroll amount in accordance with the purpose, so that it is possible to perform the scroll for the display images.

It should be noted that in the image pickup apparatus 100 according to the third embodiment too, the case has been described in which by performing the continuous movement from the left to the right with respect to the operation face of the touch panel 107 on the display screen 6G, the accumulated images are scrolled in the rewinding direction of the image pickup date and time to be displayed.

In contrast to this, in a case where the continuous movement is performed from the right to the left with respect to the operation face of the touch panel 107 on the display screen 6G, it is of course possible to scroll the accumulated images in the proceeding direction of the image pickup date and time to be displayed.

Also, in the case of the drag operation, if the finger or the like contacting the operation face is not released from the operation face even after the end of the drag operation, until the finger or the like is released, it is also possible to continue the scroll.

Therefore, in the case of the image pickup apparatus 100 according to the third embodiment, in the state shown in FIG. 8B or 8E, it is possible to perform the scroll in the direction in accordance with the continuous movement.

Such a display processing can be performed, as described above too, while the control unit 120 controls the write/read unit 134, the extension processing unit 110, the reduction/expansion unit 111, and the display processing unit 105.

It should be noted that in the case of such a scroll display, in order to facilitate the checking on the reduced image, the speed of the scroll is adjusted. For example, after maintaining the display for a certain period of time (for example, about one to two seconds), the image scroll is performed.

With this setting, without repeatedly performing the drag operation and the flick operation, it is possible to perform the image scroll. Of course, by repeatedly performing the short drag operation and the short flick operation, it is also possible to repeatedly perform the scroll processing of the display images which is accompanied with the reduction processing of the display images.

Detail of the Scroll Display Processing According to the Third Embodiment

Next, a detail of the scroll processing of the display images performed in the image pickup apparatus 100 according to the third embodiment which has been described by using FIGS. 8A to 8G will be described with reference to flow charts shown in FIGS. 9 and 10. FIGS. 9 and 10 are flow charts for explaining a reproduction processing on picked-up images including the scroll processing performed in the image pickup apparatus 100 according to the third embodiment.

This processing shown in FIGS. 9 and 10 is, similarly as in the case of the image reproduction processing according to the first embodiment shown in FIG. 5, a processing executed mainly by the control unit 120 in a case where a menu item called image reproduction processing (reproduction processing of the recorded images) is selected from the menu displayed on the display screen of the display unit 106.

Then, basically, this processing shown in FIGS. 9 and 10 is also performed similarly as in the image reproduction processing in the image pickup apparatus according to the first embodiment described by using FIG. 5. For this reason, in the flow charts shown in FIGS. 9 and 10, the same reference symbol is assigned to the step where the same processing as that in the flow chart shown in FIG. 5 is performed, and a detailed description on that part will be omitted to avoid the repetition.

Then, in the image pickup apparatus 100 according to the third embodiment, when the image reproduction processing is selected, the control unit 120 executes the processing shown in FIGS. 9 and 10. Then, the control unit 120 proceeds the processing similarly as in the image pickup apparatus according to the first embodiment described above.

That is, the control unit 120 proceeds the processing in such a manner of the image selection acceptance processing (step S101)→the processing of displaying the one selected image (step S102)→the operation input acceptance (step S103)→the determination whether or not the operation input exists (step S104).

In the determination processing in step S104, in a case where it is determined that the operation input from the user is accepted, the control unit 120 determines whether or not the accepted operation input is the continuous movement (step S105).

In the determination processing in step S105, when it is determined that the accepted operation is not the continuous movement, the control unit 120 executes the processing in accordance with the accepted operation input from the user (step S106).

In the determination processing in step S105, when it is determined that the accepted operation is the continuous movement, as described above, the distance and the speed of the continuous movement are detected, and on the basis of these, the reduction rate and the scroll amount for the display image are specified (step S301).

That is, in step S301, as described above, on the basis of the coordinate data changing in accordance with the continuous movement from the touch panel 107, the distance of the continuous movement is obtained. Also, on the basis of the coordinate data changing in accordance with the continuous movement and the time information from the clock circuit 136, the duration for the continuous movement is obtained. From the distance of the continuous movement and the duration for the continuous movement thus obtained, the speed of the continuous movement is obtained.

Then, in step S301, as the distance of the continuous movement or the speed of the continuous movement thus obtained is compared with the previously decided thresholds set for these, as described with use of FIGS. 8A to 8G, the reduction rate and the scroll amount of the display image are specified.

Next, in accordance with the specified reduction rate and the specified scroll amount of the display image, the control unit 120 executes the scroll processing of the display images which is accompanied with the reduction processing of the display images described by using FIG. 4A and FIGS. 8A to 8G (step S302).

In this processing in step S302, as described above, the control unit 120 controls the write/read unit 134 to obtain image data of a plurality of images which are the display targets decided in accordance with the reduction rate and the scroll amount for the display image. Then, the control unit 120 controls the extension processing unit 110, the reduction/expansion unit 111, and the display processing unit 105 to perform the scroll processing of the display images which is accompanied with the reduction processing of the display images.

After this, the control unit 120 determines whether or not the scroll processing is ended (step S108) and determines whether or not the contact by the user on the touch panel 107 is ended (step S109).

It should be noted that in the determination processing in step S108, when it is determined that the scroll processing is not ended, the control unit 120 continues the scroll processing in step S302.

Also, in the determination processing in step S109, when it is determined that the contact on the touch panel is not ended, the processing from step S302 is performed, but in this case, only the scroll for the display images in the display mode shown in FIG. 8B or 8E is performed.

On the other hand, in the determination processing in step S109, when it is determined that the scroll processing is ended, the flow advances to the processing in FIG. 10. Then, after maintaining the display state shown in FIG. 8B or 8E for a certain period of time (for example, about several hundred milliseconds to several seconds), the control unit 120 performs the processing of displaying the display images while being gradually expanded (step S110).

Then, as shown in FIG. 8D or 8G, the control unit 120 stands by until the image at the reaching point of the scroll is displayed on the full screen (step S111). When the image at the reaching point of the scroll is displayed on the full screen, the control unit 120 repeatedly performs the processing from step S103 of FIG. 9.

In this manner, in the image pickup apparatus 100 according to the third embodiment, it is possible to realize the scroll processing of the display images which is accompanied with the reduction processing of the display images.

Then, as described above too, in the middle of the scroll processing, as the display image is scrolled while being reduced and displayed, it is possible to check still more parts of the plurality of images before and after the relevant image on the one screen.

Then, in the case of the image pickup apparatus 100 according to the third embodiment, as described above, in accordance with the distance and the speed of the continuous movement, it is possible to decide the reduction rate of the display image and the scroll amount of the display images.

Therefore, in accordance with the state of the displayed images, the user adjusts the continuous movement performed with respect to the operation face of the touch panel 107 and decides the reduction rate and the scroll amount in accordance with the purpose, so that it is possible to perform the scroll for the display images.

With this configuration, at the time of the forward or backward feed of the display images (at the time of scrolling), the continuous images of the amount in accordance with the requests of the user can be displayed on the display screen, and the association among the image before and after the relevant image can be more easily grasped. Therefore, the memory of the user at the time of the image pickup can be more effectively recalled, and it is possible to facilitate the prompt search for the target image.

It should be noted that according to the third embodiment, depending on whether the distance of the continuous movement is equal to or smaller than the threshold or larger than the threshold or whether the speed of the continuous movement is equal to or smaller than the threshold or faster than the threshold, the reduction rate of the image and the scroll amount are decided.

However, instead of obtaining both the distance and the speed of the continuous movement are not, the reduction rate of the image and the scroll amount may be decided only on the basis of the distance of the continuous movement. Also, only on the basis of the speed of the continuous movement, the reduction rate of the image and the scroll amount may also be decided.

It should be noted that in the case of the continuous movement where both the drag operation and the flick operation are valid, both the distance and the speed of the continuous movement are obtained, and on the basis of these, the reduction rate of the image and the scroll amount may be decided.

FIG. 11 is an explanatory diagram for explaining an example of a case in which a reduction rate of an image and a scroll amount are decided on the basis of a distance and a speed of a continuous movement. In a table shown in FIG. 11, in the horizontal direction, cases where the speed of the continuous movement is faster and slower than the threshold are plotted, and in the vertical direction, cases where the distance of the continuous movement is shorter and longer than the threshold are plotted, and the table specifies contents of the scroll control in accordance with those cases.

Then, in the case of the example shown in FIG. 11, when the distance of the continuous movement is short and also the speed of the continuous movement is fast (equivalent to the flick operation), the reduction rate of the display image is set large and also the scroll amount is set large too at the time of the scroll processing.

Also, in a case where the distance of the continuous movement is long and also the speed of the continuous movement is fast (equivalent to the fast drag operation), the reduction rate of the display image is set large and also the scroll amount is set large too at the time of the scroll processing.

Also, in a case where the distance of the continuous movement is short and also the speed of the continuous movement is slow (equivalent to the slow drag operation), the reduction rate of the display image is set small and also the scroll amount is set small too at the time of the scroll processing.

Also, in a case where the distance of the continuous movement is long and also the speed of the continuous movement is slow (equivalent to the slow drag operation), the reduction rate of the display image is set small and also the scroll amount is set small too at the time of the scroll processing.

With this setting, in the case of the flick operation or in the case of the drag operation too, appropriately, the reduction rate and the scroll amount for the display image are decided, and the scroll processing of the display images accompanied with the reduction processing on the display images can be performed.

It should be noted that in the case of the above-mentioned example, only one threshold for the distance of the continuous movement and one threshold for the speed of the continuous movement are decided, but by deciding a plurality of thresholds, the reduction rate and the scroll amount for the display image can be controlled more finely.

Therefore, the reduction rate and the scroll amount for the display image are not limited to the cases shown in FIGS. 8A to 8G, and various reduction rates and various scroll amounts can be used.

Also, in a case where the reduction rate and the scroll amount for the display image are decided on the basis of both the distance of the continuous movement and the speed of the continuous movement, the mode is not limited to the example shown in FIG. 11, but various modes can be adopted.

Also, according to the above-mentioned embodiment, on the basis of at least one of the distance and speed of the continuous movement, both the reduction rate and the scroll amount for the display image are decided. However, this is not limited to the above-mentioned configuration.

For example, only one of the reduction rate and the scroll amount for the display image may be decided. For example, the reduction rate of the display image can be set constant, and the scroll amount can be varied in accordance with the continuous movement. Also, in contrast to this, the scroll amount can be set constant, and the reduction rate of the display image can be varied in accordance with the continuous movement, so that the size of the image area and the number of images to be displayed on the one screen can also be controlled.

Incidentally, according to the first to third embodiments described above, by performing the continuous movement in a state in which the one image is displayed on the entire surface of the display screen 6G, the scroll processing of the display images which is accompanied with the reduction processing of the display images is performed.

However, before the display image is actually scrolled, such a case may exist that the scroll is desired to be performed after performing the checking including the images before and after the currently displayed image.

In view of the above, in an image pickup apparatus according to a fourth embodiment of the present invention which will be described below, before executing the scroll in accordance with the continuous movement, the images before and after the display image can be checked.

Fourth Embodiment

Next, an image pickup apparatus according to a fourth embodiment of the present invention will be described. The image pickup apparatus according to the fourth embodiment is also the image pickup apparatus 100 having the configuration described by using FIG. 1. Then, in the image pickup apparatus 100 according to the fourth embodiment too, the image data obtained through the image pickup is managed, as described with use of FIGS. 2 and 3, for every folder and for every image pickup date and time. For this reason, the image pickup apparatus 100 according to the fourth embodiment will also be described with reference to FIG. 1 as well.

Then, the image pickup apparatus 100 according to the fourth embodiment performs the scroll processing of the display images which is accompanied with the reduction processing of the display images similarly as in the case of the image pickup apparatus 100 according to the first to third embodiments described above.

However, in the image pickup apparatus 100 according to the fourth embodiment, before the scroll for the display images is performed in accordance with the continuous movement, the images before and after the image displayed on the entire surface of the display screen 6G are also displayed, so that it is possible to check the relation among the images before and after the relevant image.

To be more specific, as will be described in detail, in accordance with the contact time by the finger or the like on the touch panel 107 or the pressure in the case of pressing on the touch panel 107 by the finger or the like, a plurality of images before and after the already displayed image can be displayed.

It should be noted that hereinafter, for simplifying the description, a case will be described as an example in which in accordance with the contact time by the finger or the like on the touch panel 107, a plurality of images before and after the already displayed image are displayed.

Display Mode of the Scroll Display According to the Fourth Embodiment

Figure 12A:
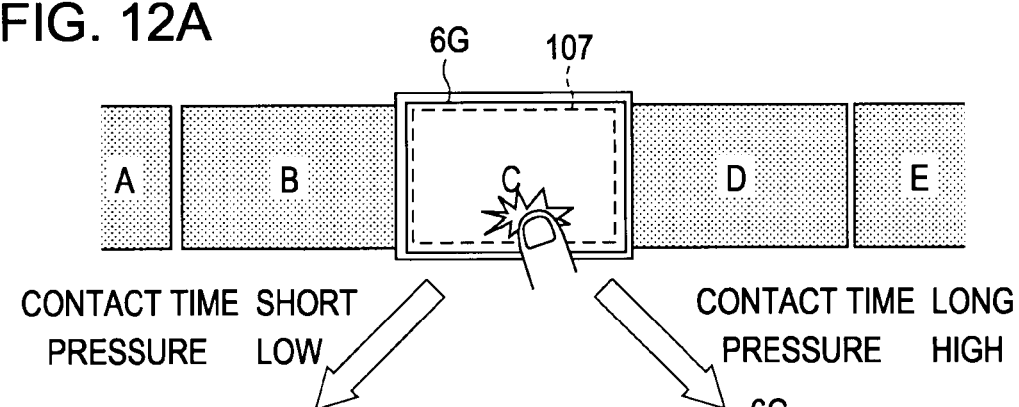
FIGS. 12A to 12E are explanatory diagrams for explaining an image display mode at the time of a display image scroll performed in an image pickup apparatus according to a fourth embodiment of the present invention.

FIGS. 12A to 12E are explanatory diagrams for explaining an image display mode at the time of a display image scroll performed in the image pickup apparatus 100 according to the fourth embodiment. Herein, FIG. 12A schematically shows a state of an image displayed on the display screen 6G of the display unit 106. Also, FIGS. 12B to 12E show transient states at the time of the scroll for the display images.

In the image pickup apparatus 100 according to the fourth embodiment too, as shown in FIG. 12A, at the current time point, a state is established in which the image C is displayed on the display screen 6G. Then, in the image folder to which the image C belongs, in a previous stage of the image C, a plurality of images such as the image B, the image A, . . . exist. Also, in a later stage of the image C, a plurality of images such as the image D, the image E, . . . exist.

Then, as shown at the center of FIG. 12A, the finger, the stylus, or the like is contacted on the operation face of the touch panel 107 of the display screen 6G where the image C is displayed, and the state is maintained as it is.

In this case, in accordance with the contact operation from the user, the touch panel 107 sequentially provides coordinate data indicating the contact position on the operation face of the touch panel 107 to the control unit 120 (for every predetermined interval.

With this configuration, the control unit 120 can determine that the user performs an operation of maintaining (holding) a state in which the finger, the stylus, or the like is contacted (pressed on the operation face of the touch panel 107 as it is.

According to the fourth embodiment, the operation in which the user contacts the operation face of the touch panel 107 by the finger or the like in this manner and keeps the state without moving this is referred to as hold operation.

Then, in a case where the user performs the hold operation, it is determined that the reduction processing on the display images is instructed by the control unit 120. Then, the control unit 120 reduces and displays the display image in accordance with the duration time for the hold operation.

Figure 12B:
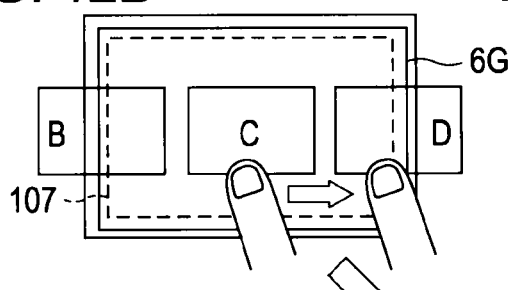
Figure 12C:
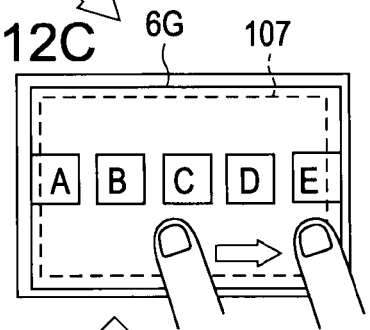

The processing of reducing and displaying the display image in this case is not the operation for only reducing and displaying the displayed image, but as shown in FIGS. 12B and 12C, is also the operation of reducing and displaying images before and after the displayed image as well.

That is, on the basis of the coordinate data from the touch panel 107, when it is detected that the hold operation is performed, the control unit 120 controls the write/read unit 134 to read out the image data of the currently displayed image and the image data of the predetermined number of images before and after the currently displayed image.

In the image pickup apparatus 100 according to the fourth embodiment, the image data of the currently displayed image and the two images each before and after the currently displayed image (the image data of the total five images) is read out to be temporarily stored in the RAM 123. The image data of these images are the targets of the reduction processing.

It should be noted that in a case where the image data of the currently displayed image already exists in the RAM 123 or the like, the relevant image data may not be read out from the recording medium 135, and the already read out image data may be used.

Then, the control unit 120 controls the extension processing unit 110, the reduction/expansion unit 111, and the display processing unit 105 to perform the reduction processing on the read image data and in accordance with the duration time for the hold operation, performs the processing of displaying the image in the mode shown in FIGS. 12B and 12C.

That is, in accordance with the duration time for the hold operation, the control unit 120 specifies the number of images to be reduced and displayed and supplies the image data of the specified number of images including the images before and after the currently displayed image at the center position to the extension processing unit 110.

For example, in accordance with the duration time for the hold operation, in a case where the images are displayed in the mode shown in FIG. 12B, the control unit 120 supplies the image data of the image B, the image C, and the image D to the extension processing unit 110.

Also, in accordance with the duration time for the hold operation, in a case where the images are displayed in the mode shown in FIG. 12C, the control unit 120 supplies the image data of the image A, the image B, the image C, the image D, and the image E to the extension processing unit 110.

In accordance with the control of the control unit 120, the extension processing unit 110 performs the extension processing on the image data subjected to the data compression which is supplied thereto to reconstruct the original image data before the data compression and supplies this reconstructed image data to the reduction/expansion unit 111.

The reduction/expansion unit 111 applies the reduction processing on the image data supplied thereto to reduce the image to have the size in accordance with the instruction and forms the image signal supplied to the display processing unit 105 from the image data after the reduction processing in accordance with the control of the control unit 120. Herein, the formed image signal is supplied to the display processing unit 105.

The display processing unit 105 combines the image signals in accordance with the control of the control unit 120, forms, as shown in FIGS. 12B and 12C, the image data for one screen composed of the reduced images in accordance with the duration time for the hold operation, and displays the images on the display unit 105.

It should be noted that the above-described reduction display processing of the images is not performed through one processing but is repeatedly performed in accordance with the duration time for the hold operation. Then, eventually, on the display screen of the display unit 105, as shown in FIGS. 12B and 12C, the image for one screen composed of the reduced images in accordance with the duration time for the hold operation are displayed.

With this configuration, the user can check which images exist before and after the currently displayed image (in the case of the example of FIGS. 12A to 12E, the image C) on the display screen 6G (within the one screen). Then, the user appropriately decides the direction of the scroll from the state before and after the image and can perform the scroll of the images in the appropriate direction.

Then, when the state shown in FIGS. 12B and 12C is established, the continuous movement is performed in which the finger of the user or the like maintaining the hold operation is kept in contact with the touch panel 107 and shifted to the right.

As described above too, on the basis of the coordinate data from the touch panel 107, the control unit 120 can determine which operation is performed with respect to the touch panel 107. In this case, as it is possible to detect the continuous movement to the right is performed, the control unit 120 determines that the scroll is instructed in which the display images are shifted to the right by one image.

Then, the control unit 120 scrolls the display images to the right side and starts the processing of expanding and displaying the display images. That is, in the case of this example, the control unit 120 specifies the image B as the image at the reaching point of the scroll and displays the images displayed to the right by one image.

That is, the control unit 120 specifies the images that should be displayed after the scroll and processes the image data of the images, as described above, through the extension processing unit 110, the reduction/expansion unit 111, and the display processing unit 105.

To be more specific, in the case of this example, the image at the reaching point of the scroll is set as the image B, and the image data of the image B and the image data of the images before and after the image B are used, so that the images are displayed while the image B is located at the center of the display screen.

After this, without performing the scroll, the processing on expanding the display images is repeatedly performed. In this case too, the image data on the image of the display target is processed through the extension processing unit 110, the reduction/expansion unit 111, and the display processing unit 105. It should be noted that in this case, in the reduction/expansion unit 111, the reduction rate is set to be gradually increased.

Figure 12D:
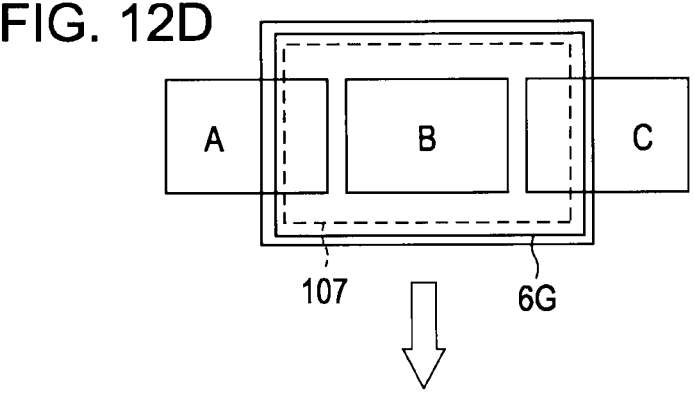

With this configuration, for example, as shown in FIG. 12D, such images are displayed that the image at the reaching point of the scroll is displayed at the center of the display screen 6G, and also the images before and after the image at the reaching point are displayed.

Figure 12E:
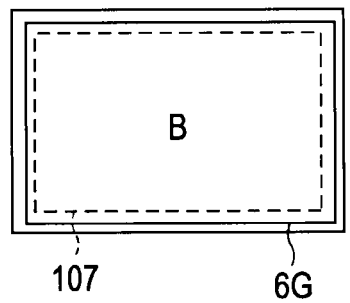

Then, eventually, through the repeatedly performed processing of expanding the display images, as shown in FIG. 12E, the image at the reaching point of the scroll (in the case of this example, the image B) is displayed on the entire surface of the display screen 6G. In a case where this state of FIG. 12E is established, the processing of expanding the display images is ended.

In this way, in the case of the image pickup apparatus 100 according to the fourth embodiment, before the scroll for the display images is performed, first, by checking the state of the images before and after the currently displayed image, it is possible to correctly specify the direction of the scroll.

Then, similarly as in the case according to the first embodiment, it is possible to perform the scroll for the display images. It should be noted that in the case of the image pickup apparatus 100 according to the fourth embodiment, as shown in FIGS. 12A to 12E, as the scroll for the display images can be performed from the reduced state, it is possible to carry out the prompt scroll processing.

Also, herein, the description has been given that the continuous movement is to shift the images in the moving direction by one image, but this is not limited to the above-mentioned configuration. For example, this may also be set that the continuous movement in the state of being reduced to the stage shown in FIG. 12B means a scroll of one image, and the continuous movement in the state of being reduced to the stage shown in FIG. 12C means a scroll of three images. That is, in accordance with the reduction rate of the image at the time of the continuous movement, the scroll amount can also be decided.

It should be noted that according to the fourth embodiment, in accordance with the duration time for the hold operation, the reduction display processing of the display images is performed. However, this is not limited to the above-mentioned configuration. In a case where the touch panel 107 is of the pressure-sensitive type and can also sense the size of the applied pressure, in accordance with the power of the pressure applied on the operation face of the touch panel 107, the reduction display processing of the display images can also be performed.

For example, in the state shown in FIG. 12A, the finger or the like is contacted with the operation face of the touch panel 107 on the display screen 6G on which the image C is displayed, and the pressure is applied. In this case, the touch panel 107 detects the pressure applied on the touch panel 107 by the user and notifies the control unit 120 of data indicating this detected pressure.

In a case where the pressure applied on the touch panel 107 is equal to or smaller than a predetermined threshold, for example, as shown in FIG. 12B, the control unit 120 performs the reduction display processing of the display images in a range where the reduction rate of the display image does not reach a previously decided maximum value.

In contrast to this, in a case where the pressure applied on the touch panel 107 is larger than the predetermined threshold, for example, as shown in FIG. 12C, the control unit 120 performs the reduction display processing of the display images so that the reduction rate of the display image reaches the previously decided maximum value.

In this way, in accordance with the press pressure applied on the touch panel 107, it is also possible to perform a similar processing to the reduction display processing of the display images in accordance with the duration time for the hold operation on the touch panel 107. In this case, the reduction rate of the display image can be promptly increased.

Modified Example of the Fourth Embodiment

Incidentally, in the case of the image pickup apparatus according to the fourth embodiment, in accordance with the duration time for the hold operation, the display image is reduced and displayed, but the maximum value of the reduction rate (how much the image is reduced) is previously decided. This is because the reduction at such a level that the user has difficulty in recognizing the image has no effect.

However, a case may be considerable that a large number of images are desired to be displayed within the one screen. In view of the above, according to a modified example of the fourth embodiment, when the hold operation is continued for a predetermined time and the display image is reduced to have the predetermined reduction rate, the display mode is switched to a matrix display of the images, so that the recognizable images can be displayed as many as possible on the display screen.

Then, in the state of the matrix display too, through the continuous movement with respect to the operation face of the touch panel 107, the scroll for the display images can also be performed. In this case, as this scroll is on the matrix display, the continuous movement can be performed in eight directions including not only left and right directions of the display screen but also up and down directions, an upper right direction, an upper left direction, a lower right direction, and a lower left direction.

Figure 13A:
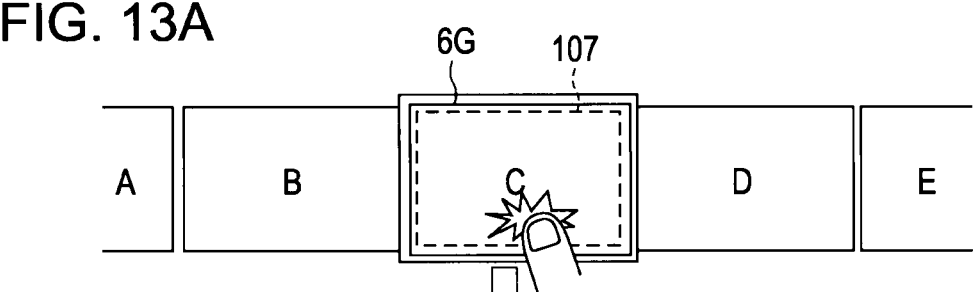
FIGS. 13A to 13F are explanatory diagrams for explaining an image display mode at the time of a display image scroll performed in an image pickup apparatus according to a modified example of the fourth embodiment of the present invention.

FIGS. 13A to 13F are explanatory diagrams for explaining an image display mode at the time of a display image scroll performed in the image pickup apparatus 100 according to a modified example of the fourth embodiment. Herein, FIG. 13A schematically shows a state of the image displayed on the display screen 6G of the display unit 106. Also, FIGS. 13B to 13F show transient states at the time of the scroll for the display images.

In the case of this modified example according to the fourth embodiment, as shown in FIG. 13A, at the current time point, a state is established in which the image C is displayed on the display screen 6G. Then, in the image folder to which the image C belongs, in the previous stage of the image C, a plurality of images such as the image B, the image A, . . . exist. Also, in the later stage of the image C, a plurality of images such as the image D, the image E, . . . exist.

Then, as shown at the center of FIG. 13A, the finger, the stylus, or the like is contacted on the operation face of the touch panel 107 of the display screen 6G where the image C is displayed, and the state is maintained as it is. In this case, similarly as in the case described above by using FIGS. 12A to 12E, on the basis of the coordinate data from the touch panel 107, the control unit 120 can determine that the hold operation is performed.

Then, in the case of this modified example according to the fourth embodiment, in a case where the hold operation is performed by the user, the control unit 120 determines that the reduction processing on the display images is instructed. Then, the control unit 120 reduces and displays the display image in accordance with the duration time for the hold operation.

Figure 13B:
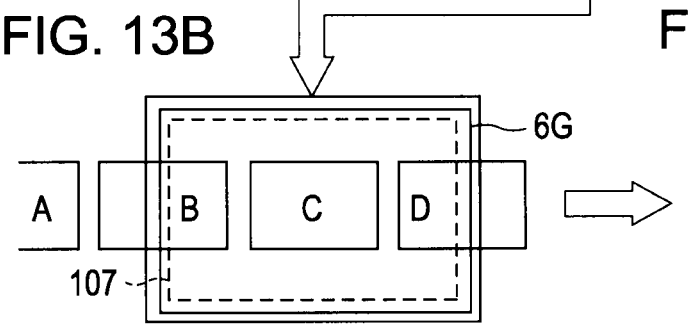

Similarly as in the case described by using FIGS. 12A to 12E, the processing of reducing and displaying the display image in this case is not the operation for only reducing and displaying the displayed image, but as shown in FIG. 13B, is also the operation of reducing and displaying images before and after the displayed image as well.

According to this modified example, when the hold operation is continued for the predetermined time or longer and the image displayed on the display screen 6G are reduced to have the previously decided size and displayed, the control unit 120 switches the display mode for the image on the display screen 6G to the matrix display.

Figure 13C:
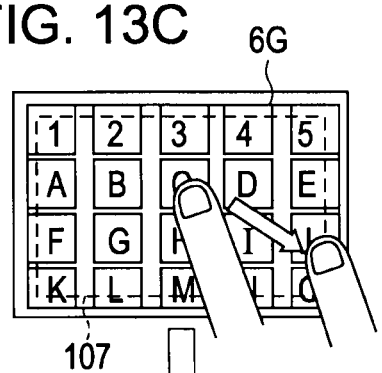

According to the modified example of the fourth embodiment, as shown in FIG. 13C, the matrix display is for displaying the thumbnail images of total 20 images on the one screen including four columns in the vertical direction (lengthwise direction) and five rows in the horizontal direction (lateral direction).

According to this modified example, the control unit 120 sets the image subjected to the hold operation (the image C) as the reference of the display images (reference image). Also, the control unit 120 sets the display position of the image on the upper side of the two images on the upper and lower sides at the center part on the matrix display, that is, the display position for the image at the third column from the left (or the right) and the second row from the top as the reference for the display images (reference position) on the matrix display.

Then, the control unit 120 reads out the seven images existing in the previous stage of the image C which is the reference image, the image C which is the reference image, and the 12 images existing in the later stage of the image C which is the reference image to perform the processing for the matrix display.

In this case, the images are displayed in the order in accordance with the image pickup date and time in such a manner that the five images are arranged and displayed from the upper left end part to the right of the display screen 6G in the reverse chronologic order of the image pickup date and time, and the next five images are displayed on the next row. Then, the image C which is the reference image is displayed at the position of the second row from the top and the third column from the left which is the reference position.

In this case too, the control unit 120 controls the write/read unit 134 to read out the image data to be used from the recording medium 135 and supplies this image data to the extension processing unit 110. The extension processing unit 110 performs the extension processing on the image data subjected to the data compression which is supplied thereto to reconstruct the original image data before the data compression and supplies the image data after the reconstruction to the reduction/expansion unit 111.

The reduction/expansion unit 111 performs the reduction processing on the image data of the 20 images supplied thereto into the matrix, forms an image signal in a format supplied to the display processing unit 105 from the image data subjected to the reduction processing, and supplies this image signal to the display processing unit 105.

The display processing unit 105 combines the image signals supplied from the reduction/expansion unit 111 thereto, forms the image signal to be supplied to the display unit 106, and supplies the image signal to the display unit 106. With this configuration, it is possible to display the 20 images recorded on the recording medium 135 on the display unit 106 in the mode shown in FIG. 13C.

With this configuration, by using the image which is subjected to the hold operation first as the reference, the user can check a plurality of images before and after the relevant image on the one screen.

Then, in the state shown in FIG. 13C, the user can perform the continuous movement in which the finger or the like is moved on the operation face while keeping the contact with the operation face of the touch panel 107.

In this case, the continuous movement can be performed, as described above too, in the eight directions including left and right, up and down, upper right, lower right, upper left, and lower left. Then, such a case as shown in FIG. 13C is considered that the "image 1" targeted by the user is displayed at the upper left end of the display screen.

In this case, in FIG. 13C, the user performs the continuous movement in which the finger or the like contacted with the operation face of the touch panel 107 on the display screen 6G is moved in the lower right direction as shown by the arrow.

In accordance with the direction of the continuous movement or the direction of the continuous movement and the reaching point of the continuous movement, or in accordance with the direction of the continuous movement and the distance of the continuous movement, the control unit 120 specifies the amount for scrolling the display images.

In the case of the example shown in FIG. 13C, the continuous movement is for moving the finger of the user from the position on which the image C is displayed to a position an image J is displayed. In this case, the control unit 120 determines that the continuous movement is for moving the display images backward by seven slots (by seven images) (operation for rewinding the time by seven images).

Figure 13D:
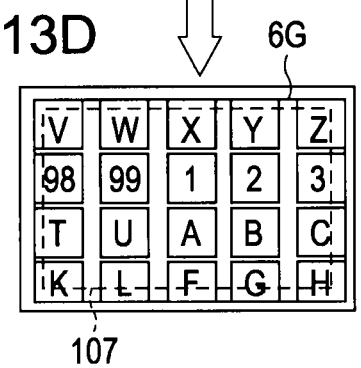

In this case, the control unit 120 also reads out the image data of the seven images before the "image 1" which is the image data belonging to the same image folder in the time sequence order from the recording medium 135. Then, the control unit 120 controls, as described above, the extension processing unit 110, the reduction/expansion unit 111, and the display processing unit 105. As shown in FIG. 13D, the matrix display from the image data belonging to the same image folder previous to the seven images in the image pickup date and time is performed.

With this configuration, in the matrix image displayed on the display screen 6G, as shown in FIG. 13D, at the position on which the image C is displayed (the reference position) at the time of FIG. 13C, the "image 1" displayed at the upper left end part at the time of FIG. 13C is displayed. In this way, in the case of this example, through the continuous movement performed by once, it is possible to perform the scroll by the seven images.

Then, after the continuous movement, when the finger or the like contacted with the operation face of the touch panel 107 is released from the operation face, the coordinate data is not supplied from the touch panel 107. Thus, the control unit 120 can determine that the contact of the finger or the like with the operation face is ended.

In this case, the control unit 120 determines that the series of the continuous movement for scrolling the display images is ended. Then, after the end of the scroll, the control unit 120 executes the expansion processing on the display images.

To be more specific, the control unit 120 sets the reference image displayed at the reference position of the display screen 6G (in FIG. 13D, the "image 1") at the center of the display screen 6G and performs the processing of displaying the reference image in a manner that the surrounding images are also included while being gradually expanded.

Figure 13E:
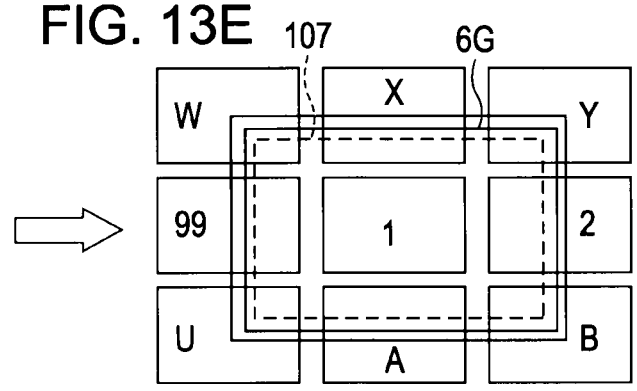

That is, in the state of FIG. 13D, when the user releases the contacted finger or the like from the operation face of the touch panel 107, as shown in FIG. 13E, by setting the reference image at the center, the control unit 120 performs the expansion display for the images also including the surrounding images.

Figure 13F:
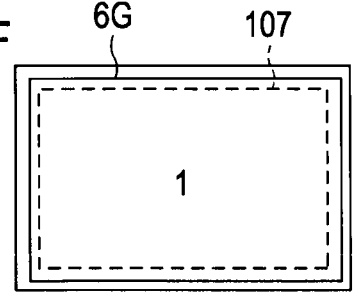

Eventually, as shown in FIG. 13F, the control unit 120 displays the reference image (in the case of this example, the "image 1") on the entire surface of the display screen 6G, and the expansion display for the images is ended, so that the processing including the image scroll is ended.

In a case where this expansion display processing for the images is performed too, similarly as in the above-described embodiment, the control unit 120 controls the respective units of the write/read unit 134, the extension processing unit 110, the reduction/expansion unit 111, and the display processing unit 105 to carry out the expansion processing on the images.

In this way, in the image pickup apparatus 100 according to the fourth embodiment, by also using the hold operation, on the straight light of the scroll for the display images, it is possible to check the still more images before and after the display image on the one screen.

With this configuration, the scrolling direction is appropriately set up, and the continuous movement is appropriately performed, so that it is possible to promptly search for the target image.

It should be noted that herein, by performing the reduction processing on the image data read form the recording medium 135, the reduced images for the matrix display (the thumbnail images) are formed. However, this is not limited to the above-mentioned configuration.

For example, thumbnail data for forming the thumbnail images is prepared in the image file, and this data may be used. In this case, the extension processing on the image data subjected to the data compression or the reduction processing on the image data subjected to the extension processing is not performed. Therefore, the load caused by the matrix display is mitigated, and the matrix display can be promptly carried out.

Also, in the case of this modified example according to the fourth embodiment, the reduction processing on the display images is not performed on the basis of the duration time for the hold operation, but the reduction processing on the display images may be performed in accordance with the pressure applied with respect to the touch panel 107.

In this case, when the pressure is applied with respect to the touch panel 107, and the pressure is equal to or lower than a predetermined threshold, the reduction processing on the image is performed in the mode shown in FIG. 13B. Then, in a case where the pressure applied with respect to the touch panel 107 is larger than the predetermined threshold, the matrix display is performed as shown in FIG. 13C. In this case, it is possible to promptly carry out the matrix display for the images.

Detail of the Scroll Display Processing According to the Fourth Embodiment

Figure 14:
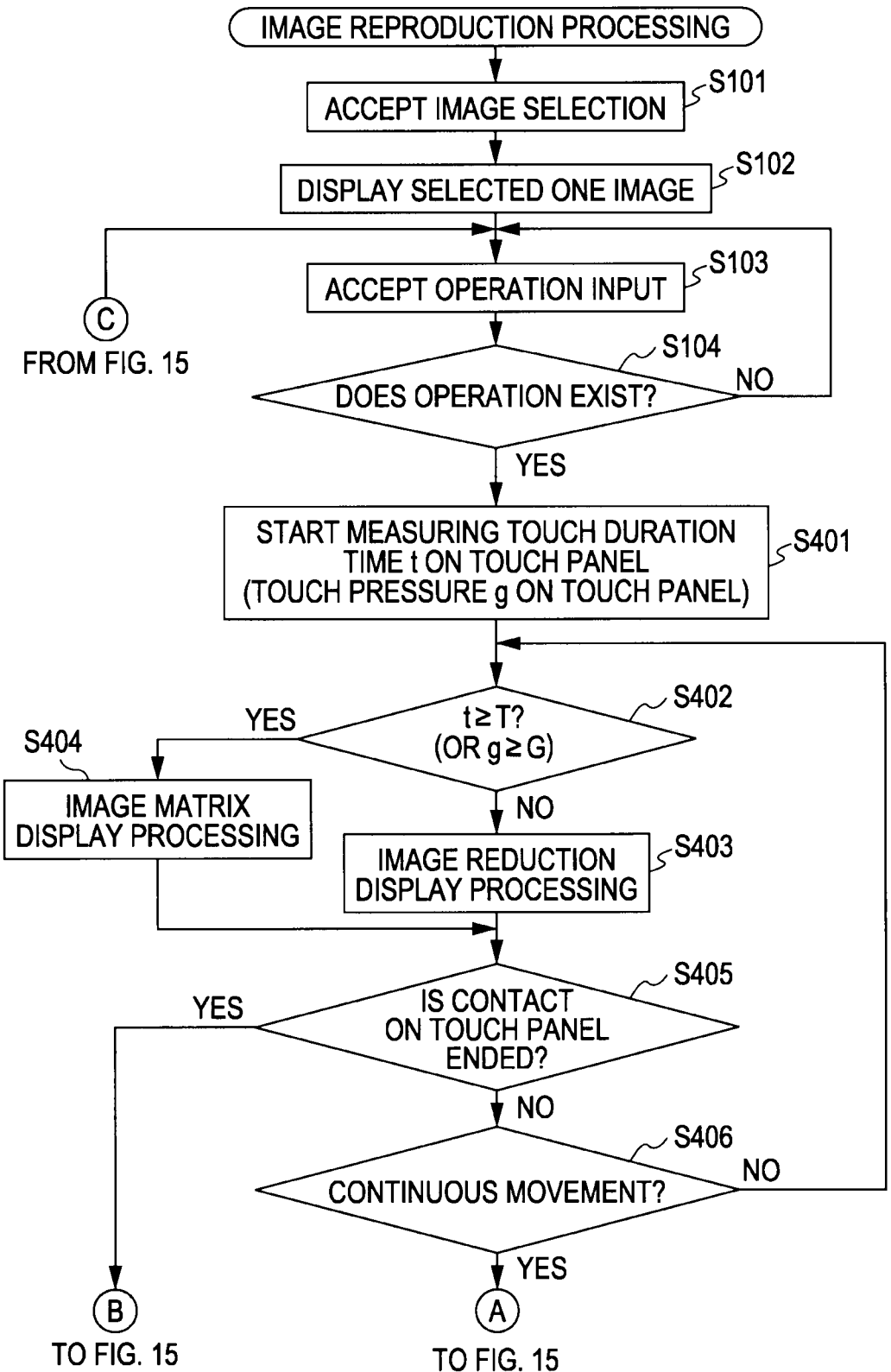
FIG. 14 is a flow chart for explaining a reproduction processing on picked-up images including the scroll processing performed in the image pickup apparatus according to the fourth embodiment.
Figure 15:
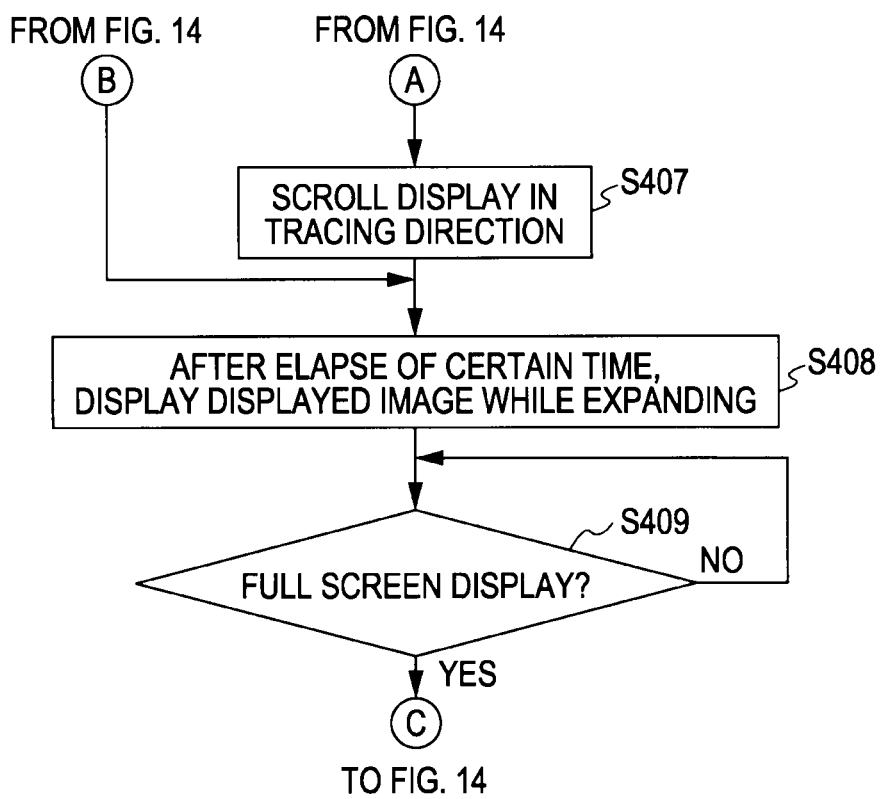
FIG. 15 is a flow chart continued from FIG. 14.

Next, a detail of the scroll processing of the display images described by using FIGS. 12A to 12E and FIGS. 13A to 13F which is performed in the image pickup apparatus 100 according to the fourth embodiment will be described with reference to the flow charts shown in FIGS. 14 and 15. FIGS. 14 and 15 are flow charts for explaining a reproduction processing on picked-up images including the scroll processing performed in the image pickup apparatus 100 according to the fourth embodiment.

This processing shown in FIGS. 14 and 15 is, similarly as in the case of the image reproduction processing according to the first embodiment shown in FIG. 5, a processing executed mainly by the control unit 120 in a case where a menu item called image reproduction processing (reproduction processing of the recorded images) is selected from the menu displayed on the display screen of the display unit 106.

Then, this processing shown in FIGS. 14 and 15 is also basically similar to the image reproduction processing in the image pickup apparatus according to the first embodiment described by using FIG. 5. For this reason, in the flow charts shown in FIGS. 14 and 15, the same reference symbol is assigned to the step where the same processing as that in the flow chart shown in FIG. 5 is performed, and a detailed description on that part will be omitted to avoid the repetition.

Then, the image pickup apparatus 100 according to the fourth embodiment, when the image reproduction processing is selected, the control unit 120 executes the processing shown in FIGS. 14 and 15. Then, the control unit 120 proceeds the processing similarly as in the image pickup apparatus according to the first embodiment described above.

That is, the control unit 120 proceeds the processing in such a manner of the image selection acceptance processing (step S101)→the processing of displaying the one selected image (step S102)→the operation input acceptance (step S103)→the determination whether or not the operation input exists (step S104).

In the determination processing in step S104, when it is determined that the operation input from the user is accepted, on the basis of the coordinate data sequentially supplied from the touch panel 107, the control unit 120 starts the measurement of the touch duration time (the duration time for the hold operation) (step S401).

It should be noted that as described above, in a case where the touch panel 107 can detect the pressure on the operation face and performs the reduction display processing of the display images in accordance with the level of the pressure, in step S401, the measurement of the pressure applied on the touch panel 107 is started.

Then, the control unit 120 determines whether or not the touch duration time t is equal to or smaller than a predetermined threshold T (step S402). It should be noted that in a case where the pressure applied on the touch panel 107 is set as the reference, in step S402, it is determined whether or not the measured pressure is equal to or smaller than a predetermined threshold G.

In the determination processing in step S402, when it is determined that the touch duration time t is equal to or smaller than the predetermined threshold T, the control unit 120 performs the reduction processing on the display images in the mode shown in FIG. 12B or 12C, or FIG. 13B (step S403).

In the determination processing in step S402, when it is determined that the touch duration time t is larger than the predetermined threshold T, the control unit 120 performs the matrix display processing for the display images in the mode shown in FIG. 13C (step S404).

After the processing in step S403 or S404, on the basis of the presence or absence of the data from the touch panel 107, the control unit 120 determines whether or not the contact with the touch panel 107 by the user is ended (step S405).

In the determination processing in step S405, when it is determined that the contact with the touch panel 107 is not ended, on the basis of the coordinate data from the touch panel 107, the control unit 120 determines whether or not the continuous movement is performed (step S406).

In the determination processing in step S406, when it is determined that the continuous movement is not performed, as the contact with the touch panel 107 is continued, the processing from step S402 is repeatedly performed to carry out the reduction processing on the display images in accordance with the touch duration time.

In the determination processing in step S406, when it is determined that the continuous movement is performed, the flow advances to the processing in FIG. 15, and the control unit 120 performs the processing of scrolling the display images in accordance with the direction of the continuous movement (step S407). This processing in step S407 is a processing of changing the display images in accordance with the direction of the continuous movement which is described by using FIGS. 12B, 12C, and 12D and FIGS. 13C and 13D.

Then, in the determination processing in step S405 shown in FIG. 14, when it is determined that the contact with the touch panel 107 is ended, and in a case where the scroll processing in step S407 of FIG. 15 is ended, a processing in step S408 shown in FIG. 15 is performed.

In this case, after maintaining the display state at that time for a certain period of time (for example, about several hundred milliseconds to several seconds), the control unit 120 performs the processing of gradually expanding the display images (step S408).

After this, the control unit 120 determines whether or not the target image after the scroll is displayed on the full screen (step S409). Herein, the target image after the scroll is an image located at the center of the display screen at the time of the reduction, an image at the reaching point of the scroll, or an image at the reference position in the matrix display.

In the determination processing in step S409, when it is determined that the target image after the scroll is not displayed on the full screen display, the processing from step S409 is repeatedly performed, and the flow stands by until the relevant target image is displayed on the full screen display.

In the determination processing in step S409, when it is determined that the target image after the scroll is displayed on the full screen display, the control unit 120 repeatedly performs the processing from step S103 shown in FIG. 14. That is, the further image scroll can be performed, and other processings can be carried out.

In this way, in the case of the image pickup apparatus 100 according to the fourth embodiment, before the scroll for the display images is performed, by checking the images in the useful range before and after the image currently displayed on the display screen 6G, it is possible to perform the scroll for the display images.

In this case, the states of the images before and after the image displayed on the display screen 6G can be checked on the one screen. Thus, it is possible to certainly determine in which direction the target image exists and perform the image scroll in the direction. That is, the scroll in a wrong direction is prevented as much as possible, and it is possible to search for the target image in a short period of time.

Effects of the Embodiments

In the case of the first to third embodiments described above, at the time of the scroll for the display images, as the scroll target images are scrolled while being reduced and displayed, the user can recognize the anteroposterior relation of the images.

With this configuration, regarding a plurality of images recorded in the image folder in the image pickup date and time order, for example, the user can view the images while being consciously aware of about which part of image is viewed. Therefore, this configuration leads to recalling the memory at the time of the image pickup for the user. Thus, even for the image group after a considerable amount of time elapses from the image pickup, it is possible to perform the image search while taking into consideration of the memory at the time of the image pickup too.

Also, in the case of the third embodiment described above, as the reduction rate of the image and the scroll amount at the time of the scroll can also be decided in accordance with the mode of the continuous movement (the distance or the speed) of the user, it is possible to perform the scroll matched with the intention of the user.

Also, in the case of the fourth embodiment described above, previous to the scroll, only through the simple operation (operation of contacting the touch panel), it is possible to check the nearby images of the displayed image within the one screen while being reduced and displayed. That is, it is possible to shift the display mode from the one screen display to the display for a plurality of reduced images, the image matrix display, or the like through the simple operation. With this configuration, it is possible to accurately determine in which direction the scroll is performed, and the inefficient scroll can be avoided.

Operability of a Method and a Program

It should be noted that as apparent from the above-mentioned embodiments, a method and a program of the present invention can be realized as the method and the program described by using the flow charts shown in FIGS. 5, 7, 9, 10, 14, and 15.

That is, the method described by using FIGS. 5, 7, 9, 10, 14, and 15 includes the method of the present invention.

Then, the program for executing the processing described by using FIGS. 5, 7, 9, 10, 14, and 15 includes the program of the present invention.

Therefore, by realizing and mounting the program of the present invention to the digital still camera or various image processing apparatuses, it is possible to realize the image processing apparatus of the present invention.

Others

Also, according to the above-mentioned embodiment, the display unit 106 realizes an image display element, the touch panel 107 realizes instruction position detection means, the recording medium 135 realizes memory means, and mainly the control unit 120 realizes display control means.

Also, according to the above-mentioned embodiment, various values can be used for the reduction rate, the scroll amount for the display image, and the like. Also, in a case where the matrix display for the images is performed, an appropriate number may be set also for the number and the size of images to be displayed on the one screen in accordance with the size of the display screen of the used device or the like.

In addition, an appropriate number can be set for the thresholds for the distance and the speed of the continuous movement, the threshold for the duration time for the hold operation, and the threshold for the pressure applied with respect to the touch panel through the touch operation while taking into account the conditions such as the performance of the device.

Also, according to the above-mentioned embodiment, the case has been described as an example in which the present invention is applied to the image pickup apparatus, but this is not limited to the above. For example, the present invention can be applied to a mobile phone terminal provided with a camera function, a mobile information terminal called PDA (Personal Digital Assistant) or the like which is capable of performing the processing on the image data, and other various image processing apparatuses capable of performing the processing on the image data.

Also, the image data of the display target is not limited to the image data of the still image. For example, the present invention can be applied to an image processing apparatus in which a representative image of a plurality of moving image contents accumulated on the recording medium or the thumbnail images are set as the display targets.

Also, according to the above-mentioned embodiment, the continuous movement from the right to the left with respect to the display screen is set as the operation in the time proceeding direction, and the continuous movement from the left to the right with respect to the display screen is set as the operation in the time rewinding direction. However, this is not limited to the above.

In contrast to this, the continuous movement from the left to the right with respect to the display screen may be set as the operation in the time proceeding direction, and the continuous movement from the right to the left with respect to the display screen may be set as the operation in the time rewinding direction.

Also, according to the first to the third embodiments described above, the image search is performed through the continuous movement in the lateral direction with respect to the display screen, but this is not limited to the above-mentioned configuration. The continuous movement in the up and down direction with respect to the display screen can be performed for searching for the image. That is, it is also possible to perform the scroll for the images in the up and down direction on the display screen.

Also, according to the above-mentioned embodiment, the description has been given that the touch panel is realized as the pressure-sensitive type or the electrostatic type, but this is not limited to the above. For example, a touch panel configured to detect a change in the luminance caused by the approach of the finger or the like and specify the instruction position or the like can be used. That is, touch panels having various configurations capable of detecting the user instruction position can be used.

The present application contains subject matter related to that disclosed in Japanese Priority Patent Application JP 2008-295303 filed in the Japan Patent Office on Nov. 19, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an image display element;
a touch panel affixed on an entire surface of a display screen of the image display element;
instruction detection means for accepting an instruction operation from a user through the touch panel and detecting and outputting a pressure indication and an instruction position of the instruction operation with respect to the touch panel;
a memory configured to store image data of a plurality of images; and
display control means for performing a control for displaying an image in accordance with the image data stored by the memory on the image display element, wherein
in a case where the user performs a continuous movement on the touch panel, the display control means performs a control for scrolling the display image together with images before and after the display image, each image reduced in size, in accordance with a mode of continuous movement determined on the basis of a detection output from the instruction detection means,
determines, based on the pressure indication corresponding to the instruction operation, a number of the plurality of images to be displayed during the continuous movement, and
performs a control for a reduction rate of the display image in accordance with the pressure indication of the instruction operation output from the instruction detecting means.

2. The image processing apparatus of claim 1, wherein:
the circuitry is configured to control, based on the pressure indication corresponding to the instruction operation, a display mode for displaying the display image and the images before and after the display image,
when the pressure is less than or equal to a predetermined threshold value, the circuitry is configured to display the display image and the images before and after the display image in a single row, and
when the pressure is greater than a predetermined threshold value, the circuitry is configured to display the image and the images before and after the display image in a matrix display mode.

3. The image processing apparatus of claim 2, wherein the matrix display mode corresponds to a state in which multiple rows of images are displayed.

4. An image processing apparatus comprising:
an image display element;
a touch panel affixed on an entire surface of a display screen of the image display element;
instruction detection means for accepting an instruction operation from a user through the touch panel and detecting and outputting a pressure indication and an instruction position of the instruction operation with respect to the touch panel;
a memory configured to store image data of a plurality of images; and
display control means for performing a control for displaying an image in accordance with the image data stored by the memory on the image display element, wherein
in a case where the user performs an operation of keeping a contact position with respect to the touch panel, the display control means,
performs a control for reducing a display image in size together with one or more images before and after the display image and displaying the size reduced images on the display screen of the image display element in accordance with an operation determined on the basis of a detection output from the instruction detection means,
controls a display mode for the image displayed on the display screen of the display element in accordance with a duration time of the operation of keeping the contact position with respect to the touch panel performed by the user,
determines, based on the pressure indication corresponding to the instruction operation, a number of the plurality of images to be displayed, and
performs a control for reduction rate of the display image in accordance with the pressure indication of the instruction operation output from the instruction detection means.

5. An image display method comprising:
accepting an instruction operation input from a user via a touch panel affixed on an entire surface of a display screen of an image display element;
detecting, by circuitry of an image processing apparatus, a pressure indication and an instruction position of the instruction operation with respect to the touch panel; and
performing, by the circuitry, control for displaying an image in accordance with image data stored in a memory on the image display element, wherein
in a case where the user performs a continuous movement on the touch panel, the performing step includes
performing control for scrolling the display image together with images before and after the display image, each image reduced in size, in accordance with a mode of continuous movement determined on the basis of the instruction operation,
determining, based on the pressure indication corresponding to the instruction operation, a number of the plurality of images to be displayed during the continuous movement, and performing control for a reduction rate of the display image in accordance with the pressure indication of the instruction operation.

6. An image display method comprising:
accepting an instruction operation input from a user via a touch panel affixed on an entire surface of a display screen of an image display element;
detecting, by circuitry of an image processing apparatus, a pressure indication and an instruction position of the instruction operation with respect to the touch panel; and
performing, by the circuitry, control for displaying an image in accordance with image data stored in a memory on the image display element, wherein
in a case where the user performs an operation of keeping a contact position with respect to the touch panel, the performing step includes
reducing in size a display image together with one or more images before and after the display image,
displaying the size reduced images on the display screen of the image display element in accordance with an operation determined on the basis of the instruction operation,
determining, based on the pressure indication corresponding to the instruction operation, a number of the plurality of images to be displayed, and
performing control for a reduction rate of the display image on the basis of the pressure indication.

7. A non-transitory computer readable storage medium on which is stored an image display program to be executed by a computer mounted on an image processing apparatus, the computer executing the method comprising:
accepting an instruction operation input from a user via a touch panel affixed on an entire surface of a display screen of an image display element;
detecting a pressure indication and an instruction position of the instruction operation with respect to the touch panel; and
performing control for displaying an image in accordance with image data stored in a memory on the image display element, wherein
in a case where the user performs a continuous movement on the touch panel, the performing step includes
performing control for scrolling the display image together with images before and after the display image, each image reduced in size, in accordance with a mode of continuous movement determined on the basis of the instruction operation,
determining, based on the pressure indication corresponding to the instruction operation, a number of the plurality of images to be displayed during the continuous movement, and
performing control for a reduction rate of the display image in accordance with the pressure indication of the instruction operation.

8. A non-transitory computer readable storage medium on which is stored an image display program to be executed by a computer mounted on an image processing apparatus, the computer executing the method comprising:
accepting an instruction operation input from a user via a touch panel affixed on an entire surface of a display screen of an image display element;
detecting a pressure indication and an instruction position of the instruction operation with respect to the touch panel; and
performing control for displaying an image in accordance with image data stored in a memory on the image display element, wherein
in a case where the user performs an operation of keeping a contact position with respect to the touch panel, the performing step includes
reducing in size a display image together with one or more images before and after the display image,
displaying the size reduced images on the display screen of the image display element in accordance with an operation determined on the basis of the instruction operation,
determining, based on the pressure indication corresponding to the instruction operation, a number of the plurality of images to be displayed, and
performing control for a reduction rate of the displayed image in accordance with the pressure indication.

9. An image processing apparatus comprising:
an image display element;
a touch panel affixed on an entire surface of a display screen of the image display element;
a memory configured to store image data of a plurality of images; and
circuitry configured to
accept an instruction operation from a user through the touch panel,
detect a pressure indication and an instruction position of the instruction operation with respect to the touch panel,
perform a control for displaying an image in accordance with the image data stored by the memory on the image display element, wherein in a case where the user performs a continuous movement on the touch panel, the circuitry is configured to
perform a control for scrolling the display image together with images before and after the display image, each image reduced in size, in accordance with a mode of continuous movement determined on the basis of the instruction operation,
determine, based on the pressure indication corresponding to the instruction operation, a number of the plurality of images to be displayed during the continuous movement, and
perform a control for reduction rate of the display image in accordance with the pressure indication.

10. The image processing apparatus according to claim 9, wherein the circuitry is configured to control a reduction state of the display image in a manner that a whole image at a scroll reaching point and image parts at a certain ratio or more of the images before and after the image at the scroll reaching point are displayed on the display screen of the display element.

11. The image processing apparatus according to claim 9, wherein the circuitry is configured to control a reduction state of the display image in a manner that a whole image at a scroll reaching point and whole images before and after the image are displayed while the image at a scroll reaching point is displayed larger than the images before and after the image.

12. The image processing apparatus according to claim 9, wherein the circuitry is configured to control a scroll amount in accordance with the mode of the continuous movement determined on the basis of the instruction operation.

13. The image processing apparatus according to claim 12, wherein the circuitry is configured to control the reduction rate and the scroll amount based on at least one of a distance and speed of the continuous movement on the touch panel.

14. The image processing apparatus of claim 9, wherein the circuitry is configured to determine the number of the plurality of images to be displayed during the continuous movement such that the number increases with increasing pressure.

15. The image processing apparatus of claim 9, wherein when the continuous movement is performed, the display image and the images before and after the display image are gradually reduced in size until the images are reduced to a predetermined minimum size.

16. The image processing apparatus of claim 9, wherein when the continuous movement is performed and the pressure indication is greater than a predetermined threshold value, the display image and the images before and after the display image are reduced at a predetermined maximum reduction rate corresponding to a predetermined maximum amount that the images are permitted to be reduced in size.

17. An image processing apparatus comprising:
an image display element;
a touch panel affixed on an entire surface of a display screen of the image display element;
a memory configured to store and hold image data of a plurality of images;
circuitry configured to
accept an instruction operation from a user through the touch panel,
detect a pressure indication and an instruction position of the instruction operation with respect to the touch panel, and
perform a control for displaying an image in accordance with the image data stored by the memory on the image display element,
wherein in a case where the user performs an operation of keeping a contact position with respect to the touch panel, the circuitry is configured to
perform a control for reducing in size a display image together with one or more images before and after the display image and displaying the size reduced images on the display screen of the image display element in accordance with an operation determined on the basis of the instruction operation,
determine, based on the pressure indication corresponding to the instruction operation, a number of the plurality of images to be displayed, and
control a display mode for the images displayed on the display screen of the image display element in accordance with the pressure indication and a duration time of the operation of keeping the contact position with respect to the touch panel performed by the user.

18. The image processing apparatus according to claim 17, wherein in a case where the user performs a continuous movement on the touch panel, the circuitry is configured to perform a control for scrolling the display images in accordance with a direction of the operation determined on the basis of the instruction position.

19. The image processing apparatus according to claim 17, wherein the circuitry is configured to control a display mode for the images displayed on the display screen of the display element in accordance with the detected pressure indication.

* * * * *